United States Patent
Kobayashi et al.

(10) Patent No.: US 6,829,112 B2
(45) Date of Patent: *Dec. 7, 2004

(54) OPTICAL PRISM, DISPLAY ELEMENT SUPPORT AND OPTICAL ASSEMBLY USING THE SAME

(75) Inventors: Hiroyoshi Kobayashi, Hachioji (JP); Yoshihiro Maeda, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/953,186

(22) Filed: Sep. 17, 2001

(65) Prior Publication Data

US 2002/0030901 A1 Mar. 14, 2002

Related U.S. Application Data

(62) Division of application No. 09/192,925, filed on Nov. 16, 1998, now Pat. No. 6,330,121.

(30) Foreign Application Priority Data

Nov. 17, 1997 (JP) .............................. 9/332441

(51) Int. Cl.[7] .............................. G02B 5/04; G02B 7/18; G09G 5/00
(52) U.S. Cl. ........................ 359/831; 359/834; 359/631; 359/633; 345/8
(58) Field of Search .............................. 359/629, 630, 359/631, 632, 633, 638, 831, 833, 834, 837; 345/7, 8, 9; 349/11

(56) References Cited

U.S. PATENT DOCUMENTS 2,594,698 A * 4/1952 Thomas
2,810,323 A * 10/1957 Coleman
3,860,329 A * 1/1975 Baker et al.
4,647,165 A * 3/1987 Lewis
4,753,514 A * 6/1988 Kubik
4,838,647 A 6/1989 Fagard
4,935,621 A * 6/1990 Pikulski
4,968,123 A 11/1990 Fournier, Jr. et al.
5,042,910 A * 8/1991 Dolezal
5,467,212 A 11/1995 Huber
5,539,422 A 7/1996 Heacock et al.
5,696,521 A 12/1997 Robinson et al.
5,847,878 A 12/1998 Togino
5,912,769 A 6/1999 Iizuka et al.
5,991,085 A 11/1999 Rallison et al.
5,999,237 A 12/1999 Miyawaki
6,046,712 A 4/2000 Beller et al.
6,084,715 A * 7/2000 Aoki et al.
6,330,121 B1 * 12/2001 Kobayashi et al.
6,404,556 B1 * 6/2002 Kobayashi
6,441,978 B1 * 8/2002 Kobayashi et al.

FOREIGN PATENT DOCUMENTS

| GB | 5561 | of 1911 |
|---|---|---|
| JP | 8-234137 | 9/1996 |
| JP | 9-73005 | 3/1997 |

* cited by examiner

Primary Examiner—Ricky D. Shafer
(74) Attorney, Agent, or Firm—Pillsbury Winthrop LLP

(57) ABSTRACT

An optical prism 100 for reflecting light incident on its light incidence surface 12 suited for incidence of light from an LCD 20 at least twice within itself and emitting the reflected light as emitted light from a light emission surface 14 to the outside. The optical prism is coupled in use with a display element support 30 adapted to suit it. The side surfaces of the optical prism crossing the light incidence surface 12 and light emission surface 14 have projections 90L and 90R for mounting the optical prism on the display element support.

13 Claims, 16 Drawing Sheets

(a)

(b)

(a)

(b)

(a)

(b)

(a)

(b)

OPTICAL PRISM, DISPLAY ELEMENT SUPPORT AND OPTICAL ASSEMBLY USING THE SAME

This is a Divisional of National Application Ser. No. 09/192,925, filed November 16, 1998 now U.S. Pat. No. 6,330,121.

BACKGROUND OF THE INVENTION

The present invention relates to optical prisms, which constitute an element of an optical system for projecting image provided by an image display device, such as an LCD, onto the retina of the eye. Such an optical prism is a main optical element of an image display unit, which is supported as a head mounted display (abbreviated HMD) on a frame member at a predetermined position thereof, the frame member being mounted on the head of the observer for singe- or double-eye observation of image.

Up to date, development of such HMDs is in progress. Devices of this type are fining increasing applications to various fields, such as medical field, construction field, educational field and game or amusement field.

Another recent trend is to develop devices which can display high quality images compatible with VGA and those which serve as displays of OA (office automation) units or the like dealing with information.

Many HMDs currently proposed or being developed are of double-eye type, comprising a left and a right image display units corresponding to and observed by the left and right eyes, respectively. For OA and like purposes, single-eye type HMDs are also proposed, which permits observation of image display with one eye while permitting forward and near viewing fields to be secured with the other eye for operating a keyboard or like operating part at the same time.

In OA and other fields, there is a demand for HMDs which are compact and convenient to use and also those which can be worn just like glasses.

However, general household HMDs are still in the stage of development, and no HMD which is not only convenient as complete product but can give sufficient solutions to various specific technical problems in manufacture, has been developed.

Japanese Patent Laid-Open No. 8-234147 discloses an optical prism of reflecting light incident on its light incidence surface suited for incidence of light from the display face of a display element such as an LCD at least twice within itself and emitting the reflected light as emitted light to the outside for being led to an observer's eye pupil.

This disclosed optical system has an integral structure having a plurality of non-spherical reflecting surfaces, and is thought to meet various optical requirements when constructed as an observation system.

Japanese Patent Laid/Open No. 9-73005 discloses an optical prism of like type, which has positioning projections formed on its sides or its securing to a different part.

However, when constructing an HMD by employing any of the above optical prisms, the optical prism and the liquid crystal display element should be highly accurately held in a regular position relation to each other in order to ensure accurate projection of image from the liquid crystal display element onto the viewer's retinas. It is a current technical subject to facilitate manufacture of optical prism while ensuring the above positioning accuracy.

In the meantime, recently optical prisms are usually manufactured by the injection molding process. The injection molding process permits obtaining molding products having a very great variety of shapes by using slide mechanisms.

FIGS. 15(a) to 15(c) schematically show a die having the above slide function. Specifically, FIG. 15(a) shows the die in a state that slide parts S are projecting into a cavity C of the die so that the cavity C has a shape corresponding to the shape of the molding product. FIG. 15(b) shows the die in a state that a molding product of a plastic or like material is being taken out from the cavity C with the slide parts S retreated therefrom. FIG. 15(c) shows the positional relation of the slide parts S and the cavity C of the die shown in FIG. 15(a) but viewed from a different position.

Prisms having various shapes can be molded by using dies having the above slide function. Such dies are well known in the art, but can be used to mold the prism according to the present invention.

FIGS. 16(a) to 16(c) schematically show a mechanism for moving slide parts of a die having a slide mechanism. This mechanism has inclined angular pins AP. The angular pins AP are adapted such that their relative displacement from their state in thorough holes formed in slide parts SL to a state out of the thorough holes, causes a retreat of the slide parts SL from a die cavity C.

In the state shown in FIG. 16(a), a fixed die FD and a movable die MD are in the close proximity of each other. In this state, the angular pins AP are deeply inserted in the thorough holes of the slide parts SL. The slide parts SL are thus projected into the cavity C, thus defining a cavity shape complementary to a complicated molding product shape.

In the state shown in FIG. 16(b), the fixed and movable dies FD and MD have been relatively displaced away from each other. As a result of this relative displacement, the inclined angular pins AP have gotten out of the die cavity C. The slide parts SL thus have retreated along and eventually got out of the die cavity C.

In the state shown in FIG. 16(c), ejector pins EP have been projected from the state shown in FIG. 16(b), thus taking out a molded product MM having undercuts UC formed by the slide parts SL.

By using the injection molding process adopting the side mechanism as described above, it is possible to relatively readily and efficiently manufacture optical prisms having various shapes.

SUMMARY OF THE INVENTION

The present invention has made in view of the above background, and it has an object of providing an optical prism of the pertaining type, which can ensure its accurate positioning with respect to a display element in an apparatus for OA apparatus field and various other purposes and also permits ready manufacture of it when it is applied as an optical element to such apparatus, as well as a display element support used with the optical prism and an assembly comprising the optical prism and the display element support.

Features and advantages of the present invention will be summarized as follows taking the prior art into account:

According to a first aspect of the present invention, there is provided an optical prism for reflecting light incident on its light incidence surface suited for incidence of light from a predetermined light source such as a display element at least twice within itself and emitting the reflected light as emitted light to the outside, wherein: the optical prism is coupled to a display element support having a constructing fitting it, the optical prism having opposite side surfaces crossing the light incidence surface and the light emission surface, the side surfaces having projections for mounting the optical prism on the display element support.

The optical prism and the display element support could not be easily coupled together with satisfactory operational efficiency in the prior art. By the first aspect of the present invention, it is possible to easily couple together the optical prism and the display element support with satisfactory operational efficiency by utilizing the projections.

According to a second aspect of the present invention, there is provided the optical prism of the first aspect, wherein the projections have positioning bosses for holding the optical prism at a predetermined position relative to the display element support.

It was difficult to easily and reliably position the optical prism and the display element support relative to each other when coupling and assembling together the two in the prior art. By the second aspect of the present invention, in addition to the first-mentioned effect of permitting each coupling together of the optical prism and the display element support with satisfactory operational efficiency, it is possible to improve the accuracy of positioning of the optical prism and the display element support relative to each other.

According to a third aspect of the present invention, there is provided the optical prism of the first aspect, which is manufactured by an injection molding process, the projections being formed by utilizing slide mechanisms used in the injection molding process.

It was difficult to form the optical prism having the first-mentioned effect such that the projections have shapes suited for various desired functions in the prior art. By the third aspect of the present invention, in addition to obtaining the first-mentioned effect, it is possible to form the optical prism having the first-mentioned effect such that the projections have shapes suited for various desired functions.

According to a fourth aspect of the present invention, there is provided the optical prism of the third aspect, which is formed such that its optical surfaces such as the light incidence surface, light emission surface and reflecting surfaces have effective zones spaced apart from edge parts formed by utilizing the slide mechanisms by 0.5 to 5.0 millimeters.

It was difficult to minimize the distortion of the effective areas of the optical prism due to movement of the slide mechanisms in the injection molding process or eliminate the possibility of deterioration of parts utilizing optical characteristics in the prior art. By the fourth aspect of the present invention, in addition to the third-mentioned effect of permitting the formation of the projections having shapes suited for various desired functions, it is possible to minimize the distortion of the effective areas of the optical prism due to movement of the slide mechanisms in the injection molding and also eliminate the possibility of deterioration of parts utilizing optical characteristics.

According to a fifth aspect of the present invention, there is provided the optical prism of the third aspect, wherein the projections formed by utilizing the slide mechanisms each have a plurality of mounting surfaces used for mounting predetermined members.

It was difficult to ensure mounting position accuracy or, if necessary, provide the optical prism with composite functions by utilizing the plurality of mounting surfaces for the mounting of various related members in the prior art. By the fifth aspect of the present invention, in addition to the third-mentioned effect of permitting the formation of the projections having shapes suited for various desired functions, it is possible to ensure mounting position accuracy and, if necessary, provide the optical prism with composite functions by utilizing the plurality of mounting surfaces for the mounting various related members.

According to a sixth aspect of the present invention, there is provided the optical prism of the third aspect, a predetermined surface of the projections formed by utilizing the slide mechanisms has an impression of cavity number used in the injection molding.

It was not ready to historically manage the optical prism in manufacture and quality control in the prior art. By the sixth aspect of the present invention, in addition to the third-mentioned effect of the present invention, it is possible to readily historically manage the optical prism in manufacture and quality control.

According to a seventh aspect of the present invention, there is provided the optical prism of the fifth aspect, wherein the plurality of mounting surfaces are parallel to one another.

It was not always ready to mount the display element (LCD) of accessory parts such as a filter, which are fitted to the optical prism in the prior art. By the seventh aspect of the present invention, in addition to the fifth-mentioned effect of ensuring mounting position accuracy and providing composite functions, it is possible to permit ready mounting of the display element (LCD) and accessory parts such as a filter, which are fitted to the optical prism.

According to an eighth aspect of the present invention, there is provided the optical prism of the first aspect, which is manufactured by an injection molding process, a die parting line for the injection molding being set such as to be in a virtual plane substantially including two edges among the edges defined by adjacent ones of its surfaces such as those functioning as the light incidence surface and light emission surface, the two edges being not adjacent to but facing each other.

It was not ready to set a die parting line in the injection molding process for the manufacture of the optical prism in the prior art. By the eighth aspect of the present invention, in addition to the first-mentioned effect of the present invention, it is readily possible to set a die parting line when the optical prism is manufactured by the injection molding process.

According to a ninth aspect of the present invention, there is provided the optical system of the eighth aspect, wherein the die parting line is set such as to be at an angle to a reference die parting line set for the injection molding, the angle being natural number degree.

It was not ready make measurements for confirming the accuracy of the die used for the injection molding in the prior art. By the ninth aspect of the present invention, in addition to obtaining the eighth-mentioned effect of permitting ready setting of the die parting line, it is possible to permit ready measurements for confirming the accuracy of the die used for the injection molding. It is thus possible to ready ensure accuracy and permit ready manufacture.

According to a tenth aspect of the present invention, there is provided the optical prism of the first aspect, wherein the edge defining the lower end of the light emission surfaces, among the edges defined by adjacent ones of the surfaces of the optical prism, is formed such as to extend along an intersection line between a virtual plane and the light emission surface, the virtual plane including a line, which is drawn from a virtual point of design, corresponding to the center of rotation of pupil of an eye of the person observing the image of the emitted light, toward the light emission surface and at a predetermined downward angle to the direction of an optical axis passing a predetermined point in the light emission surface and the virtual point.

It was difficult to minimize the portions of the optical prism other than those having the areas, in which optical characteristics are effectively used, and minimize the size of the optical prism in the prior art. By the tenth aspect of the present invention, in addition to obtaining the first-mentioned effect of the present invention, it is possible to minimize the portions other than those having the areas, in which optical characteristics are used, and minimize the size of the optical prism.

According to an eleventh aspect of the present invention, there is provided the optical prism of the first aspect, which is manufactured by an injection molding process, a die parting line for the injection molding being set in a predetermined locality, a gate for pouring resin being formed at the predetermined locality corresponding to the die parting line, a plurality of projections for ejection being formed at positions at an equal distance from centroid concerning ejecting force.

It was impossible to ensure sufficient processing efficiency when manufacturing the optical prism having the first-mentioned effect by the injection molding process in the prior art. By the eleventh aspect of the present invention, in addition to the first-mentioned effect of the present invention, the processing efficiency in the manufacture of the optical prism having the first-mentioned effect by the injection molding process, can be further improved.

According to a twelfth aspect of the present invention, there is provided the optical prism of the first aspect, wherein the projections for ejection have substantially the same thickness.

The processibility of finally shearing off the ejection projections was inferior because the shearing stroke was not always uniform in the prior art. By the twelfth aspect of the present invention, the processibility can be improved because the ejection projections are finally sheared off with a uniform shearing stroke.

According to a thirteenth aspect of the present invention, there is provided an optical prism for reflecting light incident on its light incidence surface suited for incidence of light from a predetermined light source such as a display element at least twice within itself and emitting the reflected light as emitted light to the outside, wherein: the optical prism has an anti-ghost surface based on a definition different from the definition of the optical surfaces such as the light incidence surface, light emission surface and reflecting surfaces for the reflections, the anti-ghost surface being formed such as to be adjacent and at an angle to one of the optical surfaces.

Ghost was produced in the image observed through the optical prism in the prior art. By the thirteenth aspect of the present invention, the ghost concerning the image observed through the optical prism is restricted.

According to a fourteenth aspect of the present invention, there is provided an optical prism for reflecting light incident on its light incidence surface suited for incidence of light from a predetermined light source such as display element at least twice within itself and emitting the reflected light as emitted light to the outside, wherein: the optical prism has a satin finished anti-ghost surface based on a definition different from the definition of the optical surfaces such as the light incidence surface, light emission surface and reflecting surfaces for the reflections, the anti-ghost surface being formed such as to lie in the same plane as one of the optical surfaces.

Ghost was produced in the image observed through the optical prism in the prior art. By the fourteenth aspect of the present invention, the ghost concerning the image observed through the optical prism is suppressed.

According to a fifteenth aspect of the present invention, there is provided an optical prism for reflecting light incident on its light incidence surface suited for incidence of light from a predetermined light source such as a display element at least twice within itself and emitting the reflected light as emitted light to the outside, wherein: the optical surfaces such as the light incidence surface, light emission surface and reflecting surfaces for the reflections are coated with an aluminum coat or a multi-coat, a particular surface based on a definition different from the definition of the optical surfaces being formed such as to lie in the same plane as one of the optical surfaces, the particular surface having a coat margin having a width of 1 mm or below, the coat margin being provided in a boundary locality adjacent to the adjacent optical surface.

It was impossible to provide a multi-coat without execution of difficult process of forming a film on a boundary area between a particular surface and a pertinent optical surface in the prior art. By the fifteenth aspect of the present invention, it is possible to readily form a multi-coat without execution of a difficult process of forming a film on a boundary area between a particular area and a pertinent optical surface.

According to a sixteenth aspect of the present invention, there is provided the optical prism of the first aspect, wherein at least two surfaces facing each other among the optical surfaces such as the light incidence surface, light emission surface and reflection surfaces for the reflections, have substantially the same dimension in the width direction crossing the optical axis.

It was difficult to quality evaluate the optical prism with reference to the outer dimensions in the prior art. By the sixteenth aspect of the present invention, in addition to obtaining the first-mentioned effect, the quality evaluation of the optical prism can be readily made with reference to the outer dimensions.

According to a seventeenth aspect of the present invention, there is provided the optical prism of the first aspect, wherein the optical surfaces such as the light incidence surface, light emission surface and reflecting surfaces for the refection are curved surfaces such that two adjacent ones of the optical surfaces define a curved line.

It was difficult to construct the die for obtaining the optical prism by the injection molding process in the prior art. By the seventeenth aspect of the present invention, in addition to obtaining the first-mentioned effect, the die for obtaining the optical prism by the injection molding process can be readily constructed.

According to a eighteenth aspect of the present invention, there is provided a display element support having a structure fitting an optical prism, which reflects light incident on is light incidence surface suited for incidence of light from a predetermined light source such as a display element at least twice within itself for emitting the reflected light as emitted light to the outside and has projections for mounting members, formed by utilizing slide mechanisms used in an injection molding process of manufacturing the optical prism, on the opposite side surfaces thereof crossing the light incidence surface and light emission surface, wherein: the display element support has a mounting portion having a shape complementary to the shapes of the projections of the optical prism and a stepped portion thereof formed in a predetermined one of the optical surfaces such as the light incidence surface, light emission surface and reflecting surfaces for the reflections.

It was difficult to ensure accuracy of mounting of the optical prism on the display element support in the prior art. By the eighteenth aspect of the present invention, it is possible to readily ensure accuracy of mounting of the optical prism on the display element support.

According to a nineteenth aspect of the present invention, there is provided the display element support of the eighteenth aspect, which has a portion having a facing surface facing the light incidence surface of the optical prism, the facing surface being at a angle other than right angle or a predetermined angle to a reference axis of the light incidence surface so as to evade reflection of at least some light, which has been incident on the light incidence surface from a predetermined light source and reflected from the light incidence surface toward it instead of being transmitted therethrough, toward the light incidence surface of the optical prism again.

The observation of displayed image was subject to interference by light reflected from the light incidence surface of the optical prism in the prior art. By the nineteenth aspect of the present invention, reflection of light from the light incidence surface of the optical prism can be greatly suppressed.

According to a twentieth aspect of the present invention, there is provided the display element support of the eighteenth aspect, which has a portion having an inclined facing surface facing the light incidence surface of the optical prism, the inclined facing surface being anti-reflection treated to evade reflection of at least some light, which has been incident on the light incidence surface from a predetermined light source and reflected from the incidence surface toward it instead of being transmitted therethrough, toward the light incidence surface of the optical prism again.

The observation of displayed image was subject to interference by light reflected from the light incidence surface of the optical prism in the prior art. By the twentieth aspect of the present invention, in addition to obtaining the first-mentioned effect of the present invention, reflection of light from the light incidence surface of the optical prism can be further suppressed.

According to a twenty-first aspect of the present invention, there is provided an optical assembly comprising an optical prism for reflecting light incident on its light incidence surface suited for incidence of light from a predetermined light source such as a display element at least twice within itself and emitting the reflected light as emitted light to the outside, the optical prism having opposite side surfaces crossing the light incidence surface and the light emission surface, the side surfaces having projections for mounting members thereon, the projections being formed by utilizing slide mechanisms used in an injection molding process for manufacturing the optical prism, and a display element support having a shield portion formed such as to surround the light incidence surface of the optical prism, the shield portion having a predetermined portion capable of being fitted on the optical prism from the light incidence surface side thereof, wherein: a seal or a bonding material is present between a predetermined inner surface portion of the shield portion of the display element support and a predetermined outer surface potion of the optical prism corresponding to the predetermined inner surface portion.

It was possible that the optical characteristics of the optical prism are spoiled by dust particles attached to the light incidence surface in the prior art. By the twenty-first aspect of the present invention, a shielded space can be readily formed on the light incidence surface side of the optical prism, thus reducing the possibility of spoiling of the optical characteristics by dust particles attached to the light incidence surface.

According to a twenty-second aspect of the present invention, there is provided the optical assembly of the twenty-first aspect, wherein the seal or the bonding material is capable of suppressing light reflection.

The observation of displayed image was subject to interference by light reflected from the light incidence surface of the optical prism in the prior art. By the twenty-second aspect of the present invention, reflection of light from the light incidence surface of the optical prism can be suppressed.

According to a twenty-third aspect of the present invention, there is provided an optical assembly comprising an optical prism for reflecting light incidence on its light incidence surface suited for incidence of light from a predetermined light source such as a display element at least twice within itself and emitting the reflected light as emitted light to the outside, the optical prism having opposite side surfaces crossing the light incidence surface and the light emission surface, the side surfaces having projections for mounting members thereon, the projections being formed by utilizing slide mechanism used in an injection molding process for manufacturing the optical prism, and a display element support holding a display element for forming display patterns or images to be incident on the light incidence surface of the optical prism, the display element member having a structure fitted for being engaged with the optical prism, wherein: a shield member is provided on at least either the display element support or the optical prism, the shield member defining a substantially sealed space together with the display element held in the display element support and the light incidence surface of the optical prism.

It was possible that the optical characteristics of the optical prism are spoiled by dust particles attached to the light incidence surface in the prior art. By the twenty-third aspect of the present invention a shield space is formed on the light incidence surface side of the optical prism, thus reducing the possibility of spoiling of the optical characteristics by dust particles attached to the eight incidence surface.

According to a twenty-fourth aspect of the present invention, there is provided the optical assembly of the twenty-third aspect, wherein the shield member is provided on the optical prism.

It was possible that the optical characteristics of the optical prism are spoiled by dust particles attached to the light incidence surface in the prior art. By the twenty-fourth aspect of the present invention, in addition to the twenty third-mentioned effect reducing the possibility of spoiling of the optical characteristics, the shielded space formed on the light incidence surface side of the optical prism can reduce the possibility of spoiling of the optical characteristics by dust particles attached to the light incidence surface.

According to a twenty-fifth aspect of the present invention, there is provided the optical assembly of the twenty-third aspect, wherein the shield member is provided on the optical prism.

It was possible that the optical characteristics of the optical prism are spoiled by dust particles attached to the light incidence surface in the prior art. By the twenty-fifth aspect of the present invention, in addition to obtaining the twenty third-mentioned effect, the shielded space formed on the light incidence surface side of the optical prism can reduce the possibility of spoiling of the optical characteristics by dust particles attached to the light incidence surface.

According to a twenty-sixth aspect of the present invention, there is provided the optical assembly of the twenty-third aspect, wherein shield members are provided on he optical prism and the display element support, respectively, the shield members being bonded together via flanges provided on their extensions.

It was possible that the optical characteristics of the optical prism are spoiled by dust particles attached to the light incidence surface in the prior art. By the twenty-sixth aspect of the present invention, in addition to obtaining the twenty third-mentioned effect, the shielded space formed on the light incidence surface side of the optical prism can reduce the possibility of spoiling of the optical characteristics by dust particles attached to the light incidence surface.

Other objects and features will be clarified from the following description with reference to attached drawings.

PREFERRED EMBODIMENTS OF THE INVENTION

Figure 1:
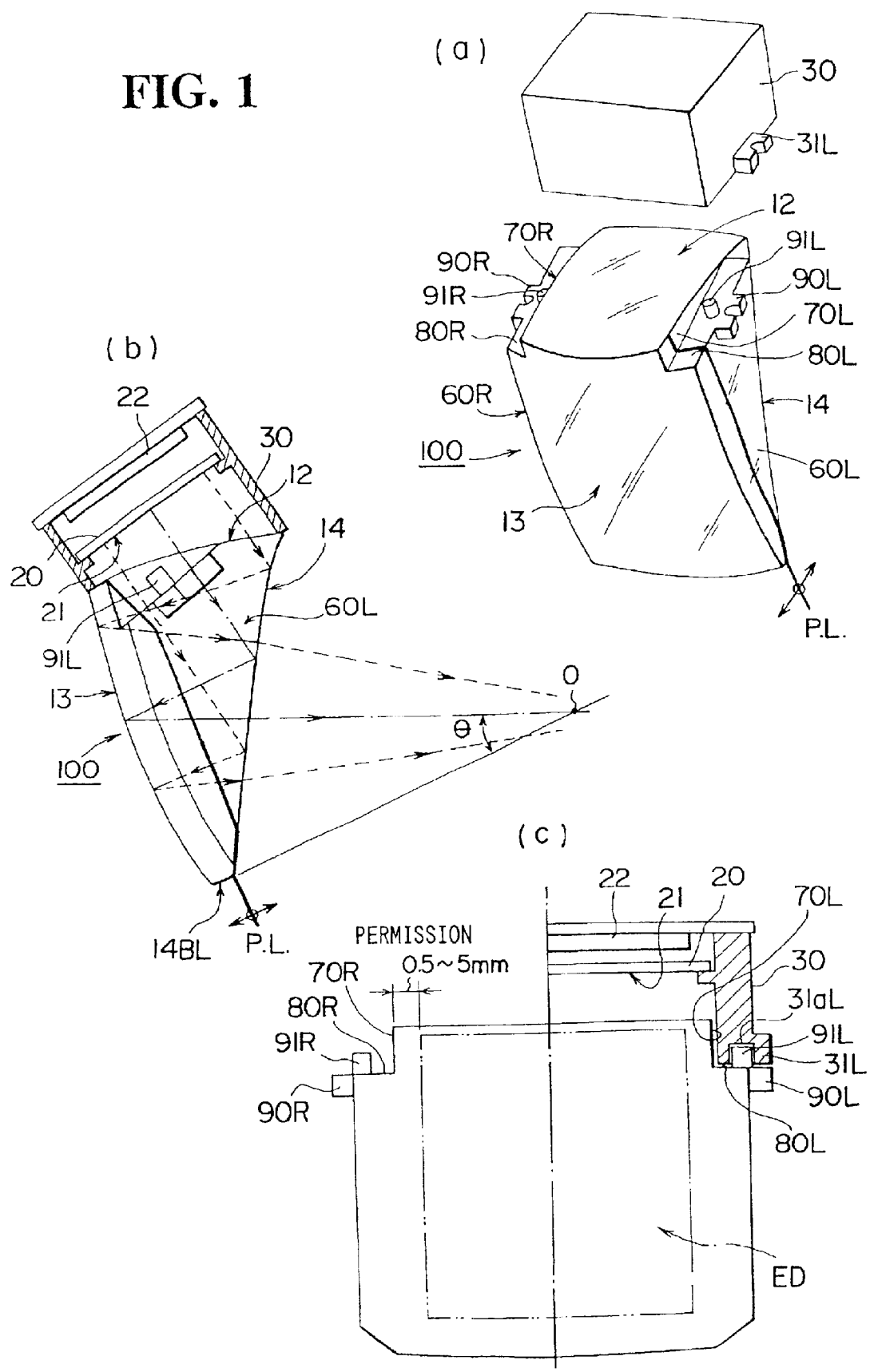
FIGS. 1(a) to 1(c) show an embodiment of the optical prism according to the present invention.

Preferred embodiments of the present invention will now be described with reference to the drawings.

FIGS. 1(a) to 1(c) show an embodiment of the optical prism according to the present invention. The optical prism shown in FIGS. 1(a) to 1(c) is of twice reflecting type, in which a light beam from the light incidence surface is reflected twice before being emitted. However, the present invention is not limited to this technical concept, but is also applicable to, for instance, optical prism of three times reflecting type, in which the incident light beam is reflected three times before emission.

FIG. 1(a) is an exploded perspective view, viewed from a front upper position, showing the embodiment of the optical prism and also a display element support employed together therewith. FIG. 1(b) is a side sectional view showing an optical assembly obtained by assembling together the optical prism and the display element support. FIG. 1(c) is a front view, partly broken away, showing the optical assembly. In FIG. 1(b), the path of light beam in the optical prism is shown by broken line arrows.

Referring to FIGS. 1(a) to 1(c), the illustrated optical prism 100 has an inclined top surface as a light incidence surface 12, which faces a display element (for instance an LCD 20) disposed in a display element support 30 and having a display face 21 and is formed such as to be suited for incidence of light on it from the display element. The optical prism 100 also has a curved rear surface as a reflecting/light emission surface 14. The reflecting/light emission surface 14 reflects light from the light incidence surface 12 within the optical prism 100, and light is finally emitted therefrom through it to the outside. The optical prism 100 further has a curved front surface as a reflecting surface 13, which extends downward from the light incidence surface 12 via an edge. The light beam having been reflected for the first time by the reflecting/light emission surface 14 on the inner side thereof, is reflected for the second time by the reflecting surface 13 within the optical prism 100. The light incidence surface 12, reflecting surface 13 and reflecting/light emission surface 14 are curved surfaces formed such as to provide predetermined optical characteristics.

The optical prism 100 further has a left and a right side surface 60L and 60R extending in a direction crossing the light incidence surface 12 (facing the display element), reflecting surface 13 and reflecting/light emission surface 14 at right angles. The left and right side surfaces 60L and 60R have recessed surfaces 70L and 70R, respectively, formed such as not to interfere with the optical path from the light incidence surface 12 to the reflecting/light emission surface 14 in an effective zone of the optical prism 100. The effective zone is shown in FIG. 1(c) as an area ED enclosed in the phantom line rectangle.

In the example shown in FIGS. 1(a) to 1(c), the recesses 70L and 70R are formed such that an upper part of the optical prism 100, which has a front and a rear surface defined by the reflecting/light emission surface 14 and the light incidence surface 12, is made narrower than a lower part of the optical prism 100, which has a front and a rear surfaces defined by the reflecting/light emission surface 14 and the reflecting surface 13, by shoulder surfaces 80L and 80R. The recesses 70L and 70R are formed by slide mechanisms of an injection molding die such that the above effective zone area ED enclosed by the phantom line rectangle is inwardly spaced apart from the shoulders 80L and 80R by 0.5 to 5.0 millimeters. This arrangement of the embodiment minimizes distortion of the effective zone of the optical prisms due to movement of the slide mechanisms in the operation of moving the optical prism by the injection molding process, and eliminates the possibility of deterioration of the performance of parts utilizing optical characteristics.

The optical prism 100 has a left and a right projections 90L and 90R for mounting it on the display element support 30. The projections 90L and 90R project sidewise from the left and right side surfaces 60L and 60R at a reference position thereof corresponding to the shoulder surfaces 80L and 80R. In this embodiment, the projections 90L and 90R are formed by utilizing slide mechanisms used in the injection molding process for the manufacture of the optical prism 100. The display element support 30 has a left and a right projections 31L and 341R (not seen in the Figure), which correspond to the projections 90L and 90R of the optical prism 100. The optical prism 100 and the display element support 30 are coupled together by joining together the projections 90L and 90R of the optical prism 100 and the projections 31L and 31R of the display element support 30. The optical prism 100 further has bosses 91L and 91R projecting from the left and right shoulder surfaces 80L and 80R at positions thereof corresponding to the projections 90L and 90R for its positioning relative to the display element support 30.

The accuracy of positioning of the optical prism 100 and the display element support 30 relative to each other can be improved by the engagement of the bosses 91L and 91R and corresponding recesses provided on the display element support 30 with one another.

As will be seen from FIG. 1(c), a mounting portion of the display element support 30 at the lower end thereof, for mounting the display element support 30 on it, has a shape of the stepped portion constituted by the recessed surfaces 70L and 70R and the shoulder surfaces 80L and 80R. Thus, the accuracy of the mounting of the optical prism 100 on the display element support 30 can be readily ensured.

A feature of the embodiment will now be described with reference to FIG. 1(b). Among the edges defined by adjacent ones of the surfaces of the outer shape of the optical prism 100, an edge 14BL which defines the lower end of the reflecting/light emission surface 14 (or light emission surface as the concerned function in this case), is formed such that it extends along an intersection of a virtual plane, which contains a line drawn from a virtual point of design, corresponding to the center of rotation of a pupil of the person who observes image of the emitted light, toward the light emission surface 14 at a predetermined downward angle θ relative to the direction of an optical axis (shown by the phantom line) passing a predetermined point in the light emission surface 14 and the virtual point O, and the light emission surface 14 with each other. Symbolically shown line designated at PL is a die parting line in the injection molding process for the manufacture of the optical prism 100.

In this embodiment, it is possible to minimize the other portions of the optical prism than those defining the areas, in which optical characteristics are effectively used, and thus minimize the size of the optical prism.

Figure 2:
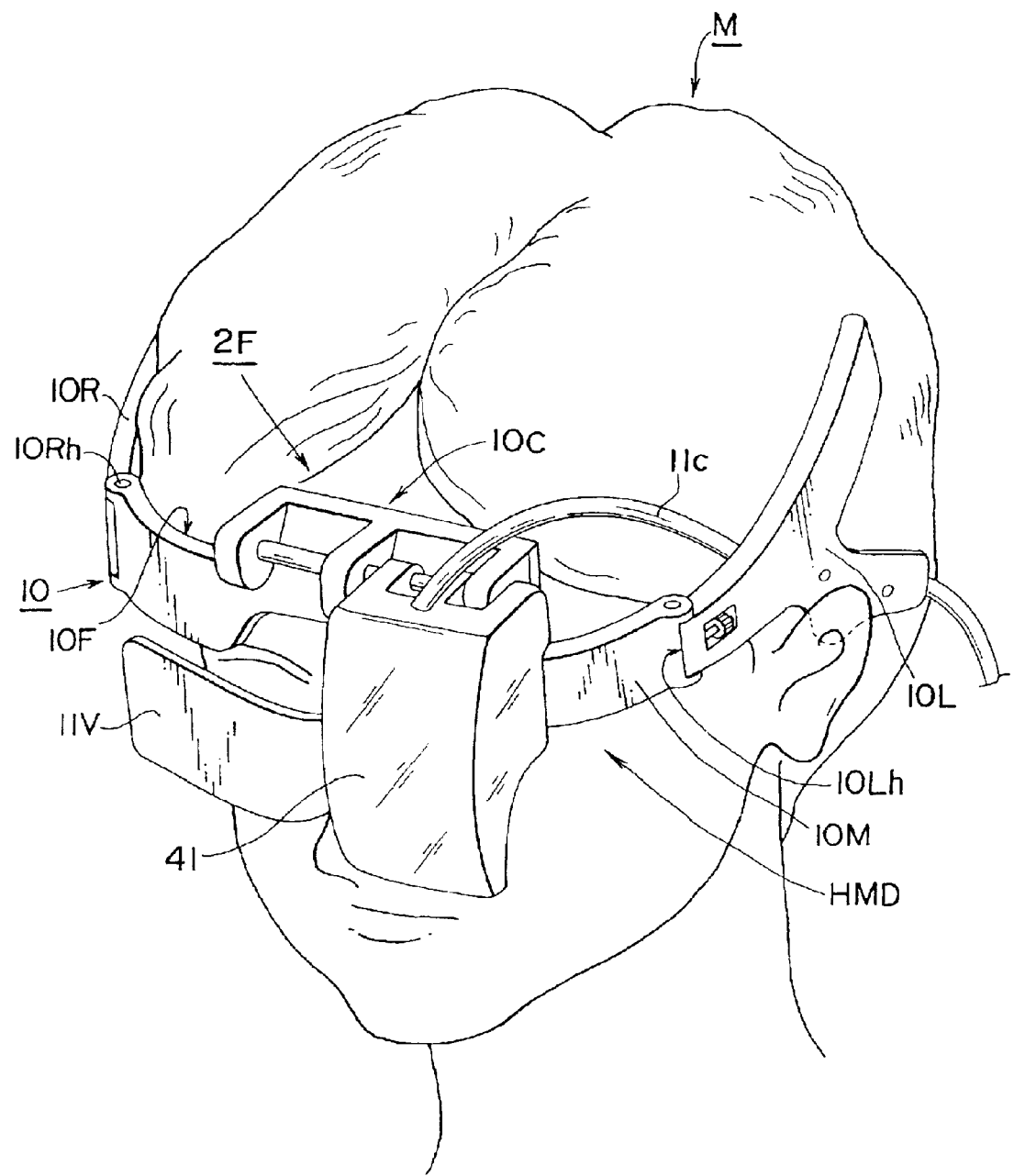
FIG. 2 shows a man M wearing a single-eye type head mounted display HMD having a display unit 41 constructed with the optical prism and the display element case in FIG. 1.

FIG. 2 shows a man M wearing a single-eye type head mounted display HMD having a display unit 41, which comprises an optical system (or optical assembly) for display, constructed with the optical prism and the display element case as described above with reference to FIG. 1.

Referring to FIG. 2, the head mounted display HMD has a frame 10, which comprises a main frame 10M as a main structural part of the display held at a position in contact with a front head part 2F of the man M who wears the display, a left and a right rear frame 10L and 10R hinged by a left and a right hinge part Lh and Rh, respectively, to the main frame 10M.

The main frame 10M has an upper coupling mechanism 10C for suspending, at a predetermined position, a display unit 41 having a display part providing the display of image supplied through an image signal transmission line cord 11c. The display unit 41 in this example includes a light permeability restricting member 11V, which restricts the visible light permeability with respect to the forward viewing field of the eye not observing the image display of the display unit to 70 percent or below such that image can be observed without being interrupted. The light permeability restricting member 11V thus effectively suppresses viewing field struggle in image observation with two eyes.

The main frame 10M also has a forced contact front head support member 10F, which is held in forced contact with the front head part 2F or the neighborhood thereof of the man M by a predetermined force applied in the direction of the normal line to that part and thus restricts its displacement relative thereto.

As shown above, the frame 10 of this embodiment of the head mounted display is adapted to be restricted in position relative to the head part of the man M who wears it by the elastic force of its entirety. Thus, it can have a simple construction not using any spring or like elastic member, and its size and weight can be readily reduced.

In this display, for obtaining the above elastic force the left and right rear frames 10L and 10R are formed by using a plastic material among polyamide, polycarbonate, polypropylene, ABS, polyethylene, polyethylene terephthalate and polyacetal. The main frame 10M is formed by using carbon-containing engineering plastic.

The frame 10 constructed by using the above materials can provide sufficient elastic force for obtaining an adequately position restricted state of it. In addition, the carbon-containing engineering plastic that is used provides excellent rigidity and reduces the possibility of distortion of the frame and hindering of the observation of image.

The left and right rear frames 10L and 10R are coupled by flexible coupling mechanisms to the main frame 10M. That is, as described before, in this embodiment the left and right rear frames 10L and 10R are hinged by the left and right hinge parts 10Lh and 10Rh as coupling mechanisms to the main frame 10M.

Figure 3:
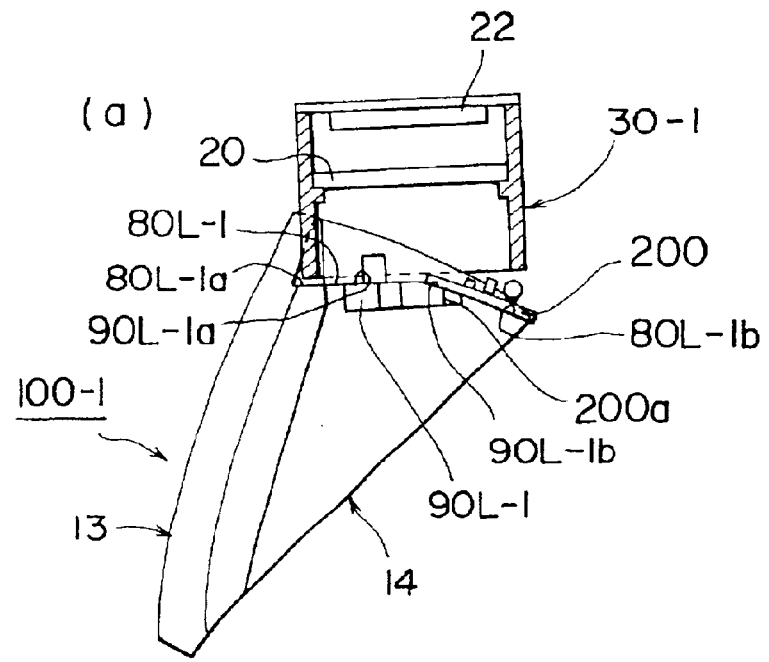
FIGS. 3(a) and 3(b) show a modification of the embodiment with reference to FIGS. 1(a) to 1(c)
Figure 3:
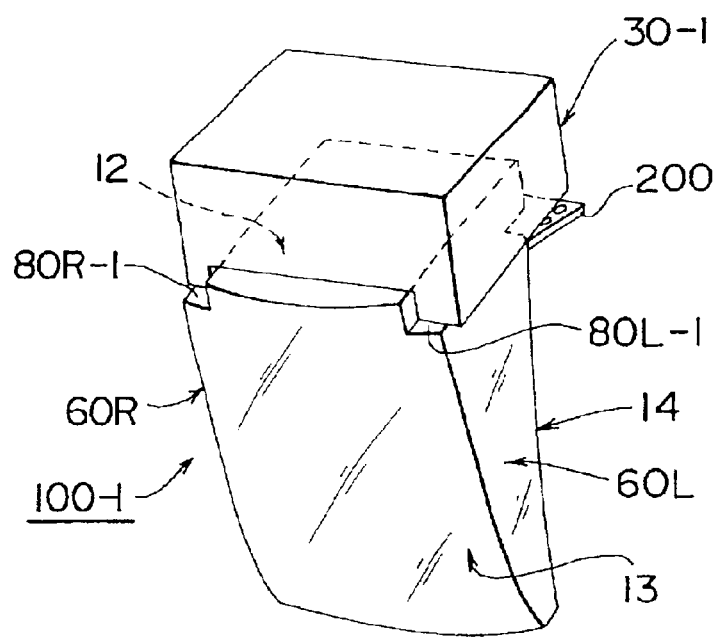

FIGS. 3(a) and 3(b) show a modification of the embodiment described above with reference to FIGS. 1(a) to 1(c). Specifically, FIG. 3(a) is a side sectional view showing an optical assembly obtained by assembling together an optical prism 100-1 and a display element support 30-1. FIG. 3(b) is a perspective view, taken from an obliquely upper position, showing the optical assembly shown in FIG. 3(a). In FIGS. 3(a) and 3(b), parts like those shown in FIGS. 1(a) to 1(c) are designated by like reference numerals, and are not described in detail.

In the modification shown in FIGS. 3(a) and 3(b), projections 90L-1 and 90R-1 (projection 90R-1 being not seen) which are formed by utilizing slide mechanisms as described before, have pluralities of mounting surfaces 90L-1a, 90L-1b and 90R-1a, 90R-1b (mounting surfaces 90R-1a, 90R-1b being not seen) formed adjacent to one another at different inclination angles to horizontal for mounting predetermined members. Likewise, a left and a right shoulder surfaces 80L-1 and 80R-1 (shoulder surface 80R-1 being not seen) which correspond to the left and right shoulder surfaces 80L and 80R in the embodiment shown in FIGS. 1(a) to 1(c), have pluralities of mounting surfaces 80L-1a, 80L-1b and 80R-1a, 80R-1b (mounting surfaces 80R-1a, 80R-1b being not shown) formed adjacent to be another at different inclination angles to horizontal.

With this arrangement, it is possible to ensure accuracy of mounting positions by utilizing the pluralities of mounting positions for mounting various related members. In addition, the arrangement permits imparting the optical prism with composite functions as desired.

For example, the second mounting surfaces 90L-1b and 90R-1a may be utilized for appropriately mounting a printed circuit board 200, with electronic parts mounted thereon, by means of board mounting screws 200a while ensuring accuracy of mounting positions (such as inclination angle). Also, the first mounting surfaces 90L-1a and 90R-1a may be utilized for mounting the display element support 30-1 in a stable state while securing accuracy of mounting positions.

Figure 4:
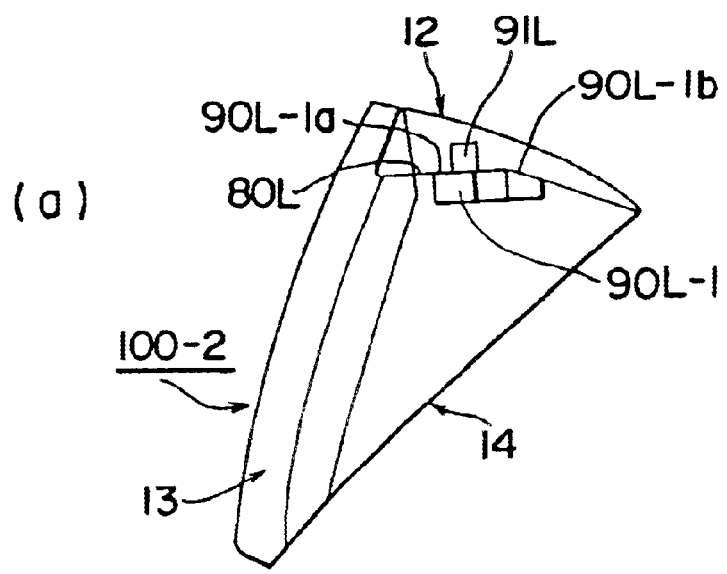
FIGS. 4(a) and 4(b) show a different modification of the optical prism described above with reference to FIGS. 1(a) to 1(c)
Figure 4:
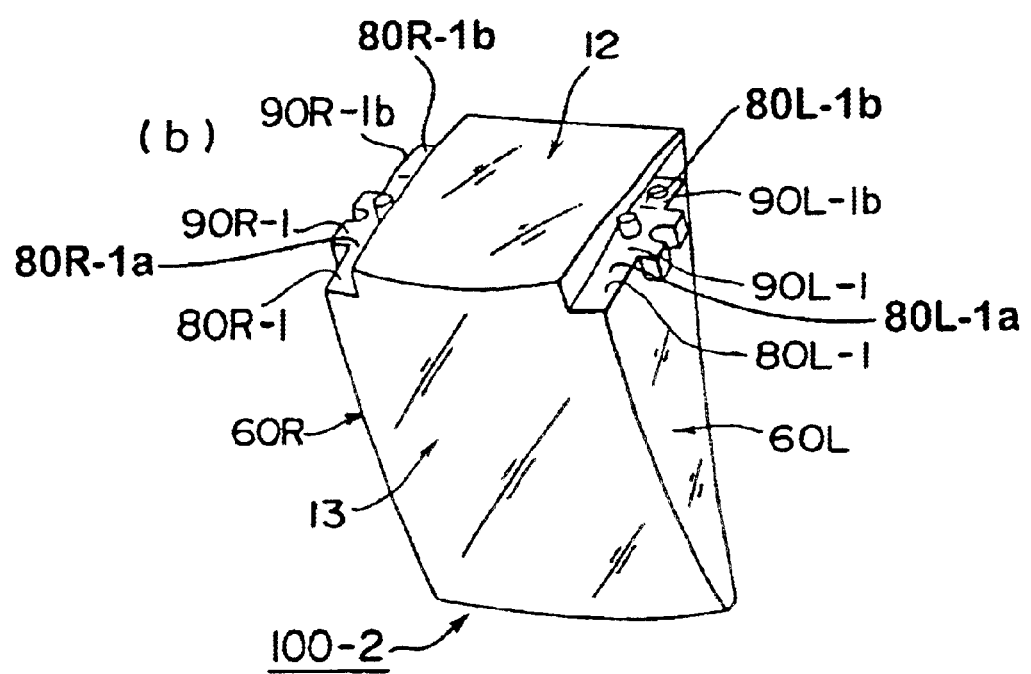

FIGS. 4(a) and 4(b) show a different modification of the optical prism described above with reference to FIGS. 1(a) to 1(c). Specifically, FIG. 4(a) is a sectional view showing an optical prism 100-2. FIG. 4(b) is a perspective view, taken from an obliquely upper position, showing the optical prism shown in FIG. 4(a). In FIGS. 4(a) and 4(b), parts like those shown in FIGS. 1(a) to 1(c) are designated by like reference numerals, and are not described in detail.

In the modification shown in FIGS. 4(a) and 4(b), the projections 90L-1 and 90R-1 noted above, formed by utilizing the slide mechanisms in the injection molding process, have pluralities of mounting surfaces 90L-1a, 90L-1b and 90R-1a, 90R-1b formed adjacent to one another at different inclination angles to horizontal for mounting predetermined members. Likewise, a left and a right shoulder surface 80L-1 and 80R-1 (shoulder surfaces 80R-1) which correspond to the left and right shoulder surfaces 80L and 80R in the embodiment shown in FIGS. 1(a) to (1c), have pluralities of mounting surfaces 80L-1a, 80L-1b and 80R-1a, 80R-1b (mounting surfaces 80R-1a, 80R-1b being not seen) adjacent to one another at different inclination angles to horizontal.

Particularly, in this embodiment a predetermined surface (for instance mounting surface 90L-1b) of the pluralities of mounting surfaces has an impression of cavity number used in the injection molding.

With this arrangement that a cavity number of a mold user for the manufacture of the optical prism is provided on a predetermined one of the pluralities of molding surfaces, it is possible to facilitate historical management of the optical prism in manufacture, quality control and so forth.

Figure 5:
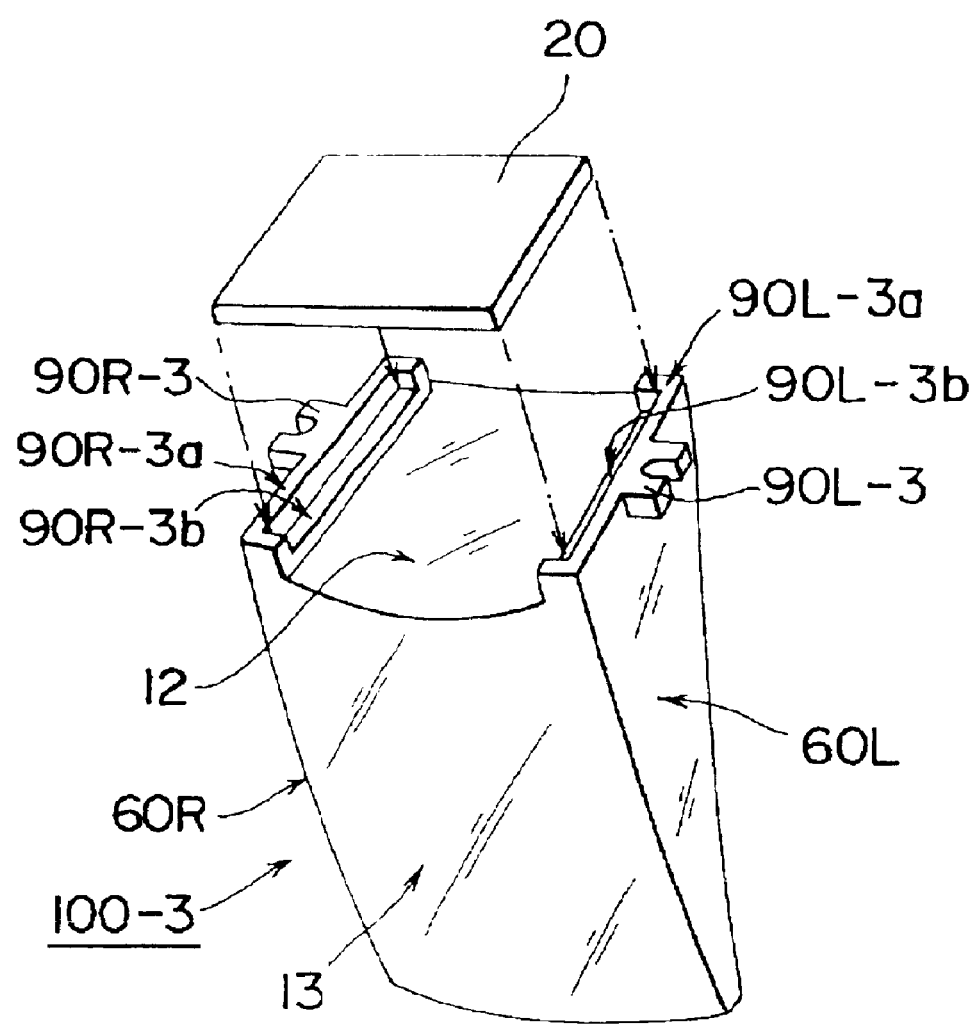
FIG. 5 shows a perspective view of a further modification of the optical prism with reference to FIGS. 1(a) to 1(c)

FIG. 5 is a perspective view, taken from an obliquely upper position, showing an optical prism 100-3 as a further modification of the optical prism described before with reference to FIGS. 1(a) to 1(c). In FIG. 5, parts like those in FIGS. 1(a) to 1(c) to 4(a) and 4(b) are designated like reference numerals.

This optical prism 100-3 has a left and a right parallel longitudinal surface 90L-3a and 90R-3a, which are flush in level with the top surfaces of the projections 90L-3 and 90R-3 noted above, formed by utilizing the side mechanisms used in the injection molding process for the manufacture of the injection molding process. The optical prism also has a let and a right parallel longitudinal surface 90L-3b and 90R-3b recessed or stepped by a predetermined depth (corresponding to the thickness of the LCD display element 20) from the longitudinal surfaces 90L-3b and 90R-3b.

The stepped surfaces 90L-3b and 90R-3b are used as mounting surfaces for mounting the LCD display element 20.

Figure 6:
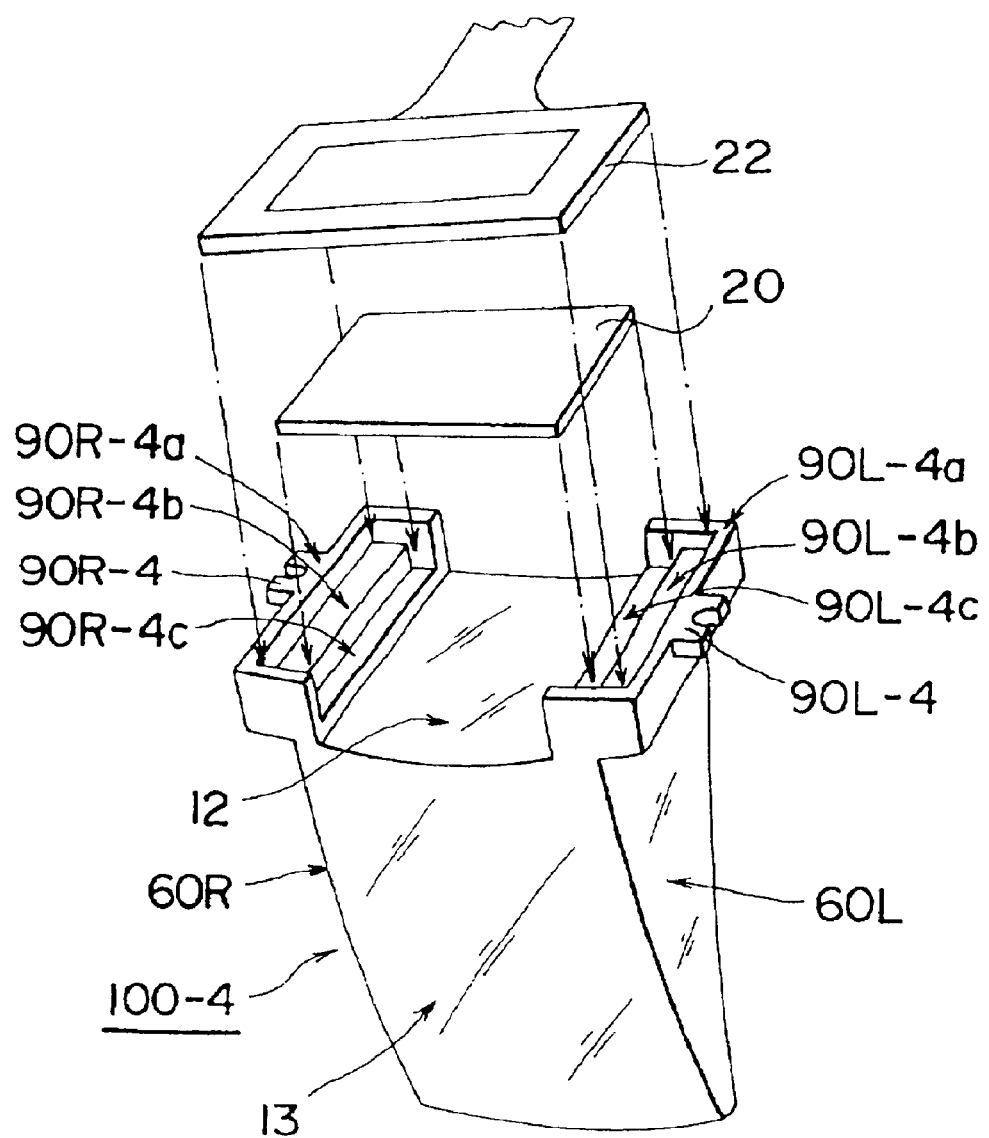
FIG. 6 shows a perspective view of a still further modification of the optical prism with reference to FIGS. 1(a) to 1(c)

FIG. 6 is a perspective view, taken from an obliquely upper position, showing an optical prism 100-4 as a still further modification of the optical prism described before with reference to FIGS. 1(a) to 1(c). The optical prism shown in FIG. 6 is similar in many respects to the optical prism shown in FIG. 5, but it has a feature that, while the optical prism shown in FIG. 5 has a single-step recessed structure in the left and right stepped surfaces 90L-3b and 90R-3b, it has a double-step recessed structure.

The optical prism shown in FIG. 6 has a left and a right parallel longitudinal surface 90L-4a and 90R-4a, which are flush with the top surfaces of the projections 90L-4 and 90R-4, formed by utilizing the slide mechanisms used in the injection molding process for the manufacture of the optical prism. The optical prism also has a left and a right parallel longitudinal surface 90L-4b and 90R-4b recessed or stepped by a predetermined depth (corresponding to the thickness of the backlight 22) from the longitudinal surfaces 90L-4a and 90R-4a. The optical prism further has a left and a right parallel longitudinal surface 90L-4c and 90R-4c stepped by a predetermined depth (corresponding to the thickness of the LCD display element 209) from the stepped longitudinal surfaces 90L-4b and 90R-4b.

The first stepped longitudinal surfaces 90L-4b and 90R-4b are used as mounting surfaces for mounting the backlight 22. The second stepped longitudinal surfaces 90L-4c and 90R-4c are used as mounting surfaces for mounting the LCD display element 20.

The modification prisms shown in FIGS. 5 and 6, as described before, facilitate mounting of the display element (i.e., LCD) and/or backlight fitted to them and also such accessory parts as filters as desired.

FIGS. 7(a) and 7(b) illustrate the setting of a die parting line of the optical prism 100 described before with reference to FIGS. 1(a) to 1(c). Specifically, FIG. 7(a) is a side view showing the optical prism. FIG. 7(b) is a perspective view, taken from an obliquely upper position, showing the optical prism 100 shown in FIG. 7(a). In FIGS. 7(a) and 7(b), parts like those shown in FIGS. 7(a) and 7(b) are designated by like reference numerals.

As described before in connection with FIGS. 1(a) to 1(c), the optical prism 100 is manufactured by the injection molding process. In the optical prism, the light incidence surface 12 and the reflecting surface 13 define an edge, and the reflecting/light emission surface 14 and reflecting surface 13 define an edge. In the description so far, by the term "edge" is meant a position like an edge substantially defined by two surfaces as shown rather than a mathematically strictly defined edge. This meaning of the edge also applies to the following description.

A die parting line PL3 for the injection molding is defined such as to be in a virtual plane substantially including two edges E1 and E2, which are not adjacent to but facing each other. As shown, the die parting line PL3 is accurately slightly forwardly spaced apart from the opposite edges 13EL and 13ER of the reflecting surface 13, which are defined by the reflecting surface 13 and the left and right side surfaces 60L and 60L.

Figure 7:
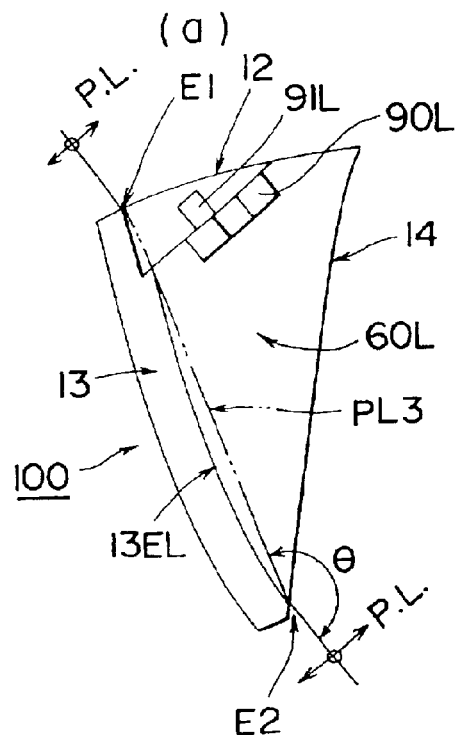
FIGS. 7(a) and 7(b) show setting of a die parting line of the optical prism 100 with reference to FIGS. 1(a) to 1(c)
Figure 7:
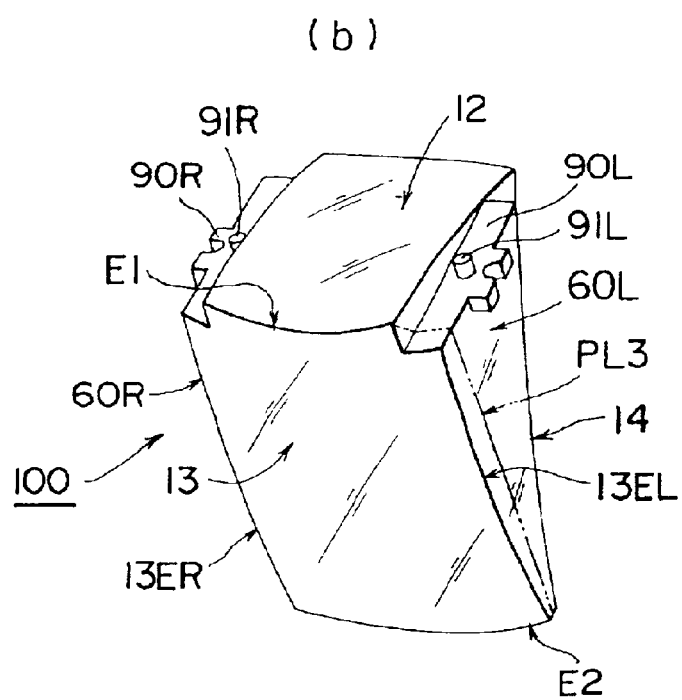

The method of setting the die parting line PL3 as shown in FIG. 7 permits ready setting the die parting line in the injection molding process for the manufacture of the optical prism 100.

The die parting line PL3 described in connection with FIG. 7 is set to be at angle $\theta$ to a reference die parting line P, L. In this example, the angle $\theta$ is set to be of natural number degrees. This arrangement facilitates measurement for confirming the accuracy of the die for the injection molding, and permitting ready accuracy ensuring and ready manufacture.

Figure 8:
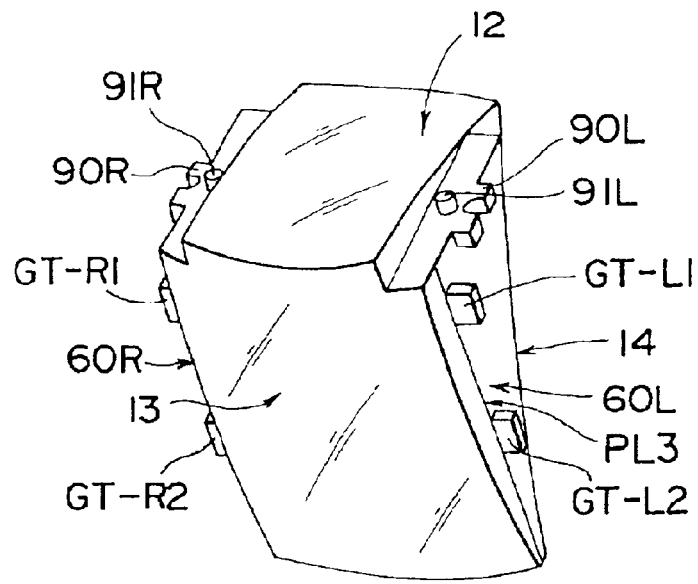
FIGS. 8(a) and 8(b) show views for describing the setting of gates for the manufacture of the optical prism by the injection molding process.
Figure 8:
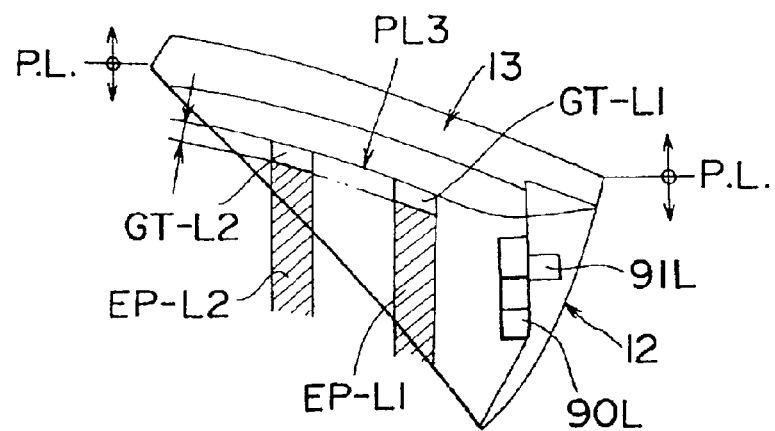

FIGS. 8(a) and 8(b) are views for describing the setting of gates for the manufacture of the optical prism 100 described before in connection with FIGS. 1 and 7 by the injection molding process. Specifically, FIG. 8(a) is a perspective view, taken from an obliquely upper position, showing the optical prism 100. FIG. 8(b) is a side view showing the optical prism 100 shown in FIG. 8(a). In FIGS. 8(a) and 8(b), parts like those in FIG. 7 are designated by like reference numerals.

As shown in FIG. 8(a), in this optical prism 100, the left side surface 60L has a gate GT-L1 for pouring resin in the injection molding process and a projection GT-L2 for ejection, the gate GT-L1 and projection GT-L1 being formed at an adequate vertical space along the die parting line PL3. Likewise, the right side surface 60R has a gate GT-R1 and a projection GT-R2 formed at an adequate spacing along the die parting line. As shown in FIG. 8(b), the gate GT-L1 and projection GT-L2 on the left side surface 60L are ejected by ejector pins EP-L1 and EP-L2 when the optical prism is taken out as a molding product from the die. The gate GT-R1 and GT-R2 are also ejected at the same time. As is seen, the gates GT-L1 and GT-R1 and projections GT-L2 and GT-R2 serve as a functioning part when pouring resin in the injection molding process and also a projection part (pressure bearing part) for receiving pushing forces exerted by the ejector pins for taking out the molding product from the die.

Particularly, the gates GT-L1 and GT-R1 and the projections GT-L2 and GT-R2 are formed at equidistant positions from the centroid of the optical prism concerning the ejection force received from the corresponding ejector pins EP-L1, EPL2 and EP-R1, EP-R2 (ejector pins EP-R1, EP-R2) being not shown), and have an equal thickness.

With the construction as described with reference to FIGS. 8(a) and 8(b), the molding product can be readily and reliably ejected from the die, thus improving the processing efficiency of the injection molding process for the manufacture of the optical prism.

In addition, since the ejection projections (i.e., gates GT-L1 and projections GT-R1, GT-L2 and GT-R2) have an equal thickness, these projections can be sheared finally sheared apart with a uniform shearing stroke, and the processing property is thus improved.

Figure 9:
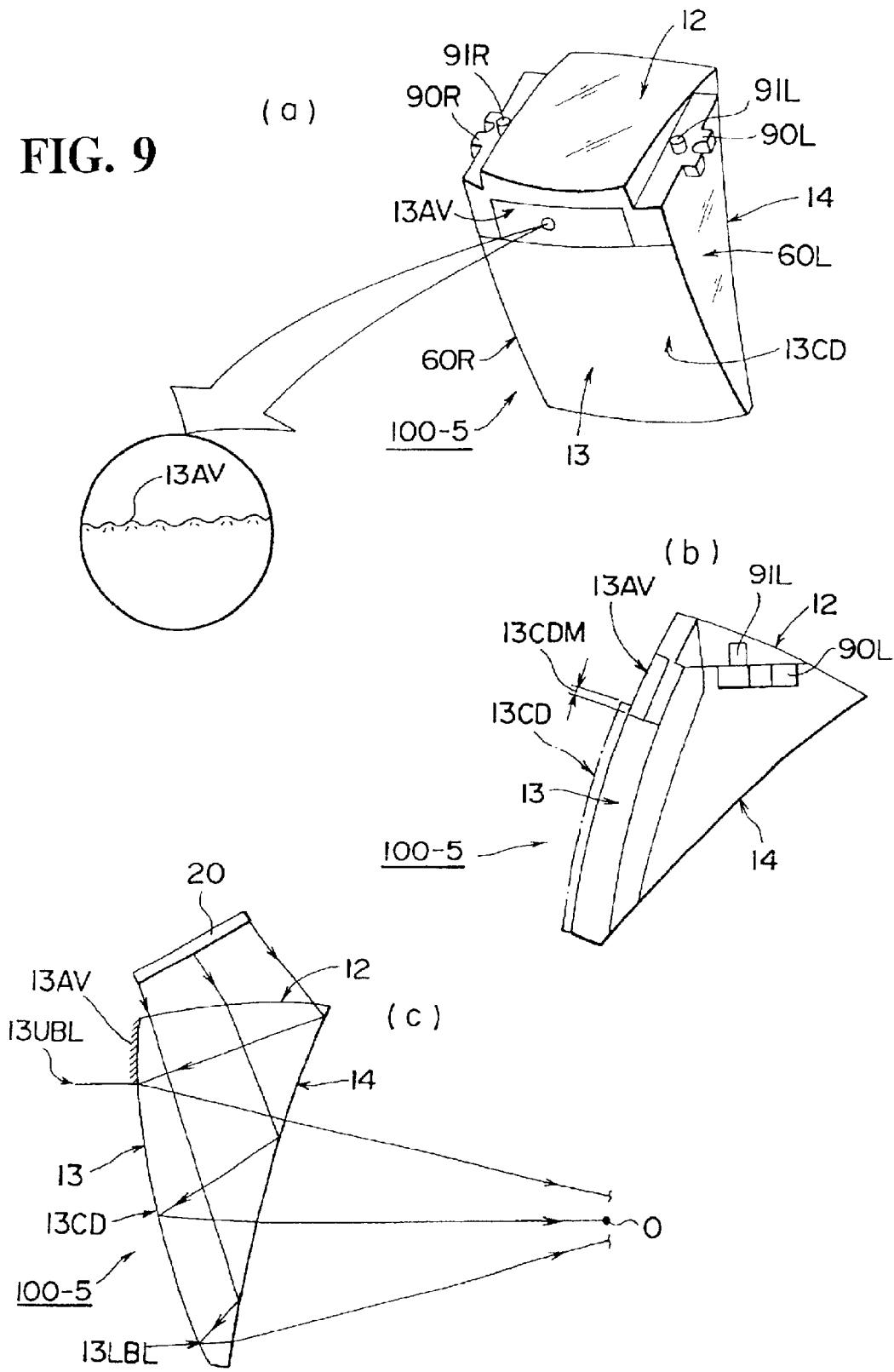
FIGS. 9(a) to 9(c) show a further modification of the optical prism with reference to FIGS. 1(A) to 1(c)

FIGS. 9(a) to 9(c) show a further modification of the optical prism described before with reference to FIGS. 1(A) to 1(c). Specifically, FIG. 9(a) is a perspective view, taken from an obliquely upper position, showing the optical prism 100-5. FIG. 9(b) is a side view showing the optical prism 100-5 shown in FIG. 9(a). FIG. 9(c) is a schematic view for describing optical characteristics of the optical prism 100-5 shown in FIG. 9(a). Referring to FIGS. 9(a) to 9(c), parts like those in FIGS. 1(a) to 1(c) are designated by like reference numerals.

In this modification of the optical prism 100-5, the reflecting surface 13 has a coated area 13CD, which is obtained by providing a multi-coat on a predetermined area, i.e., substantially the entire effective area utilizing optical characteristics. The reflecting surface 13 also has a satin finished area 13AV formed above the coated area 13CD for preventing ghost when observing LCD display image through the optical prism 100-5. The reflecting surface 13 further has a coat margin area 13CDM having a predetermined width (for instance 1 mm or below) formed as a boundary zone between the coated area 13CD and the satin finished area 13AV for permitting the process of forming the multi-coat properly. Owing to the presence of the coat margin area 13CDM, the multi-coat can be readily formed without need of such a difficult process of forming a film on a boundary area between a particular surface and the pertinent optical surface.

The satin finished area 13AV is at a predetermined angle to the coated area 13CD, and constitutes an area which is based on a definition different form that of the coated area 13CD, thus providing an anti-ghost effect.

Referring to FIG. 9(c) for describing optical characteristics of the optical prism 100-5 having the above structure, a light beam from the LCD 20 is reflected by an area, which is defined between an upper light beam line 13UBL as the boundary line between the coated area 13CD and the satin finished area 13 and a lower light beam line LBL as the lower end line of the effective area of the area 13CD, and directed toward the pupil rotation center O. The satin furnished area 13AV has an anti-ghost effect when observing displayed image on the LCD 20.

Figure 10:
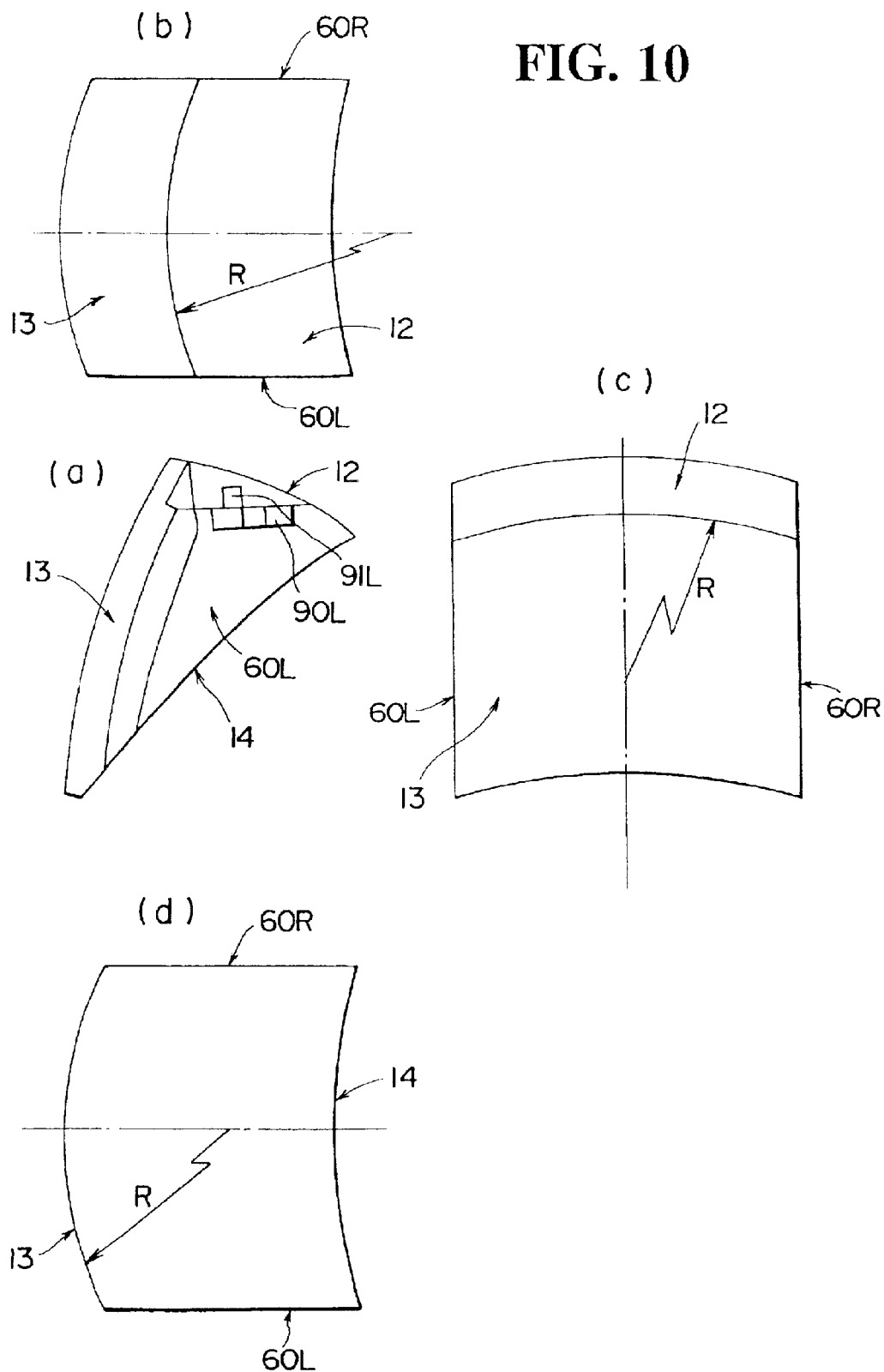
FIGS. 10(a) to 10(d) show schematic views for describing the features of the outer shape of the optical prism 100 with reference to FIG. 1.

FIGS. 10(a) to 10(d) are schematic views for describing the features of the outer shape of the optical prism 100 described before with reference to FIG. 1. Specifically, FIG. 10(a) is a side view is a side view showing the optical prism 100. FIG. 10(b) is an upper view of the same. FIG. 10(c) is a back view of the same. FIG. 10(d) is a lower view of the same. Parts like those shown in FIGS. 1(a) to 1(c) are designated by like reference numerals.

As is seen from FIGS. 10(a) to 10(d), the optical surfaces of the optical prism 100, such as the light incidence surface 12, reflecting surface 23 and reflecting/light emission surface 14, are formed as curved surfaces with adjacent ones thereof forming a curved edge (with curvature radius R). It is thus possible to readily construct a die for manufacturing the optical prism by the injection molding process. In addition, at least two surfaces facing each other among the optical surfaces of the optical prism, have substantially the same width dimension in the direction crossing the optical axis. This arrangement facilitates quality evaluation of the optical prism with reference to the other dimensions.

Figure 11:
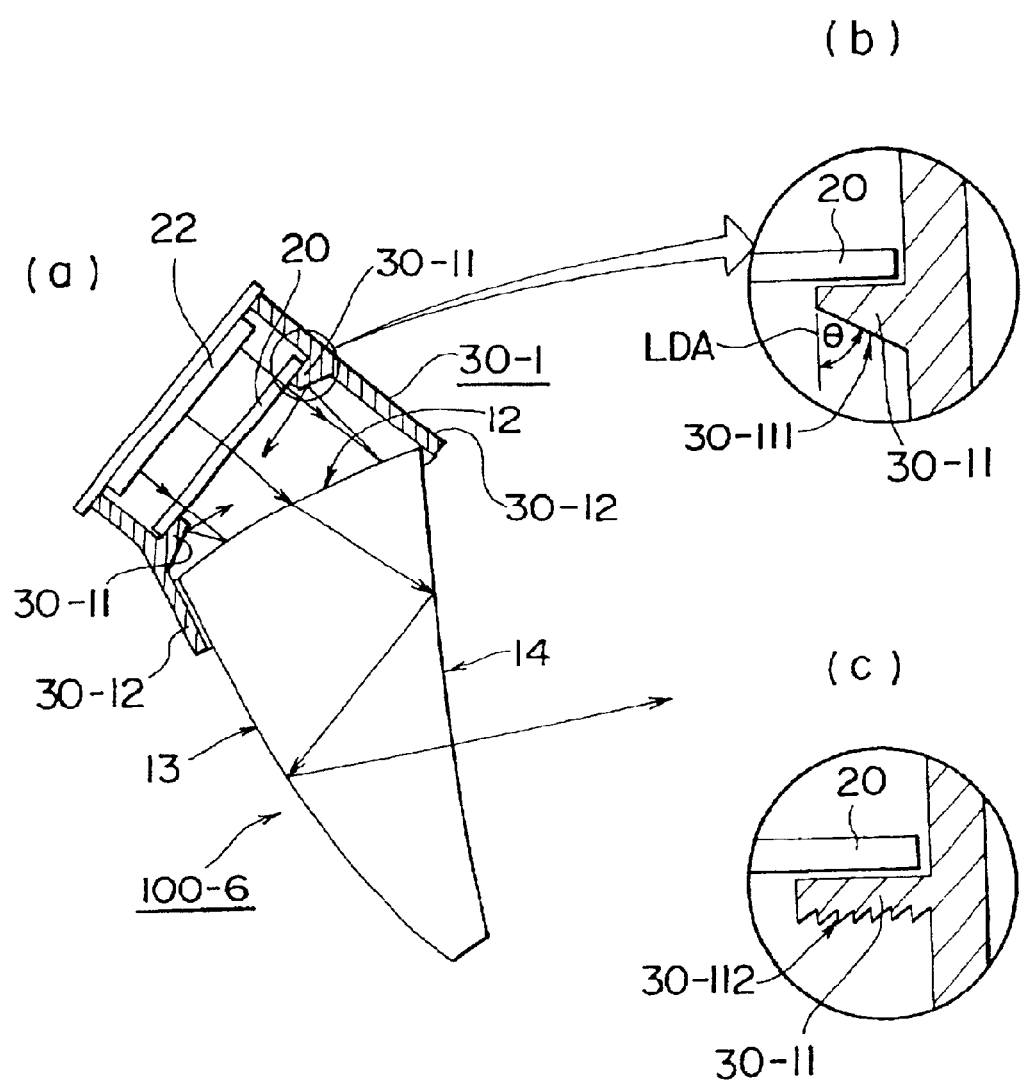
FIGS. 11(a) to 11(c) show a modification of the optical prism with reference to FIG. 1.

FIGS. 11(a) to 11(c) show a modification of the optical prism described before with reference to FIG. 1. Specifically, FIG. 11(a) is a side view, partly in section, showing an optical assembly obtained by assembling together an optical prism and a display element support. FIG. 11(b) is a fragmentary enlarged-scale sectional view showing a featuring part of the display element support in the optical assembly. FIG. 11(c) is a view similar to FIG. 11(b) but showing a modification of the featuring part shown in FIG. 11(b).

As shown in FIG. 11(a), this display element support 30-1, like what has been shown before, supports the LCD 20 as the display element and the corresponding backlight 22, and has a skirt 30-12, and is assembled with the optical prism 100-6 with the skirt 30-12 fitted on a head portion thereof on the side of the light incidence surface 12. As is seen with reference to FIG. 11(b) as well, the display element support 30-1 has an inner projection 30-11 for supporting the LCD 20. The lower surface of the projection 30-11 is formed as a facing surface 30-111, which faces the light incidence surface 12 of the optical prism 100-6.

The facing surface 30-111 is set to be at right angles or a predetermined angle θ to a reference axis LDA of the light incidence surface 12 so as to evade reflection of at least some light, which has been incident on the light incidence surface 12 from the LCD (light source) 20 emitting displayed image light toward it instead of being transmitted through the light incidence surface 12, toward the same again. Thus, adverse effects of the reflection of light from the light incidence surface 12 of the optical prism 100-6 can be greatly suppressed.

For the evasion of the reflection of light toward the light incidence surface 12 of the optical prism, it is possible to use an anti-reflection surface, such as a roughened surface, as a facing surface 30-112 facing the light incidence surface 12 as shown in FIG. 11(c), which is a fragmentary enlarged-scale view like FIG. 11(b), instead of the facing surface 30-111 at a particular angle to the light incidence surface as shown in FIG. 11(b).

Figure 12:
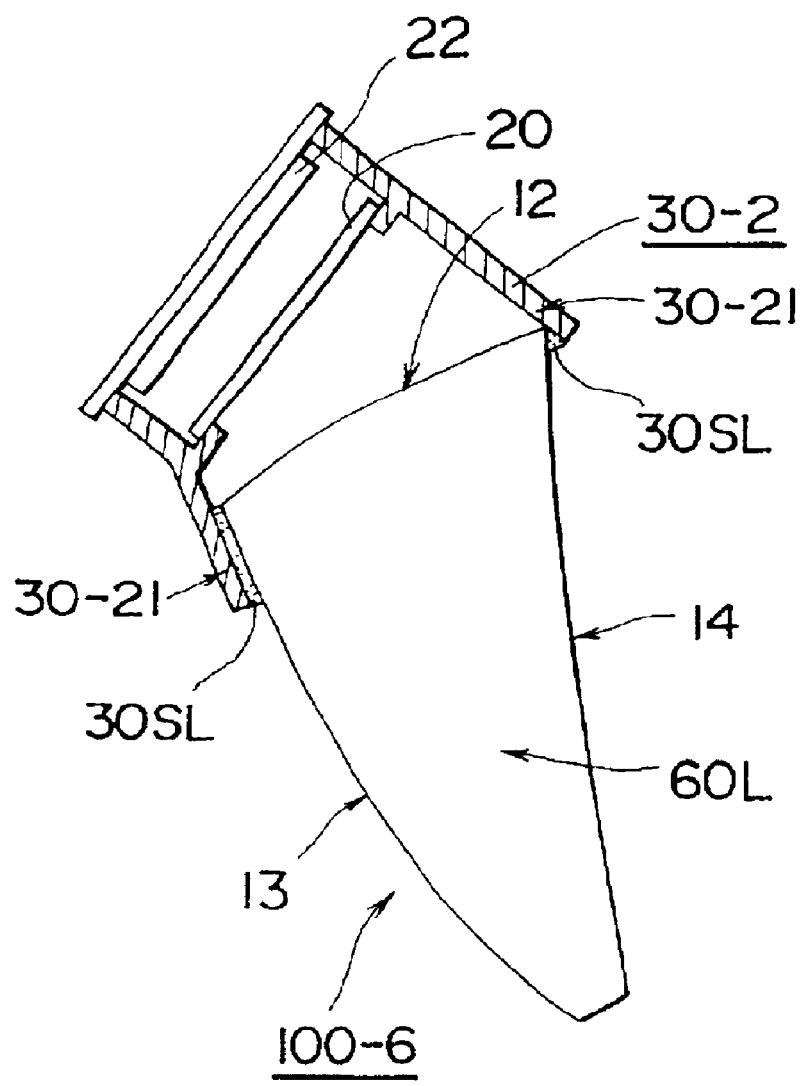
FIG. 12 shows a view showing a modification of the optical assembly with reference to FIGS. 1(a) to 1(c)

FIG. 12 is a view showing a modification of the optical assembly described before with reference to FIGS. 1(a) to 1(c). In FIG. 12, parts like those shown in FIGS. 1(a) to 1(c) and 7, are designated by like reference numerals.

This display element support 30-2, like the preceding one, supports the LCD 20 and the corresponding backlight 22, and its skirt 30-21 is assembled with the optical prism 100-6 such as to be fitted on a head portion thereof on the side of the light incidence surface 12.

In this optical assembly, a sealing agent 30SL is provided on a portion of the inner surface of the skirt 30-2 of the display element support 30-2 that is in contact with the head portion of the optical prism 100-6. The sealing agent 30SL bonds together the display element support 30-2 and the optical prism 100-6. As the sealing agent 30SL is selected one, which has the bonding function and also a character of suppressing reflection of light.

In the optical assembly 100-6 shown in FIG. 12, a sealed space can be readily formed on the side of the light incidence surface 12, thus reducing the possibility of spoiling of the light incidence surface 12 by dust particles attached thereto.

In addition, since the sealing agent 30SL serving as bonding agent has a character of suppressing reflection of light, it is possible to suppress light reflection on the side of the light incidence surface 12 of the optical prism 100-6.

Figure 13:
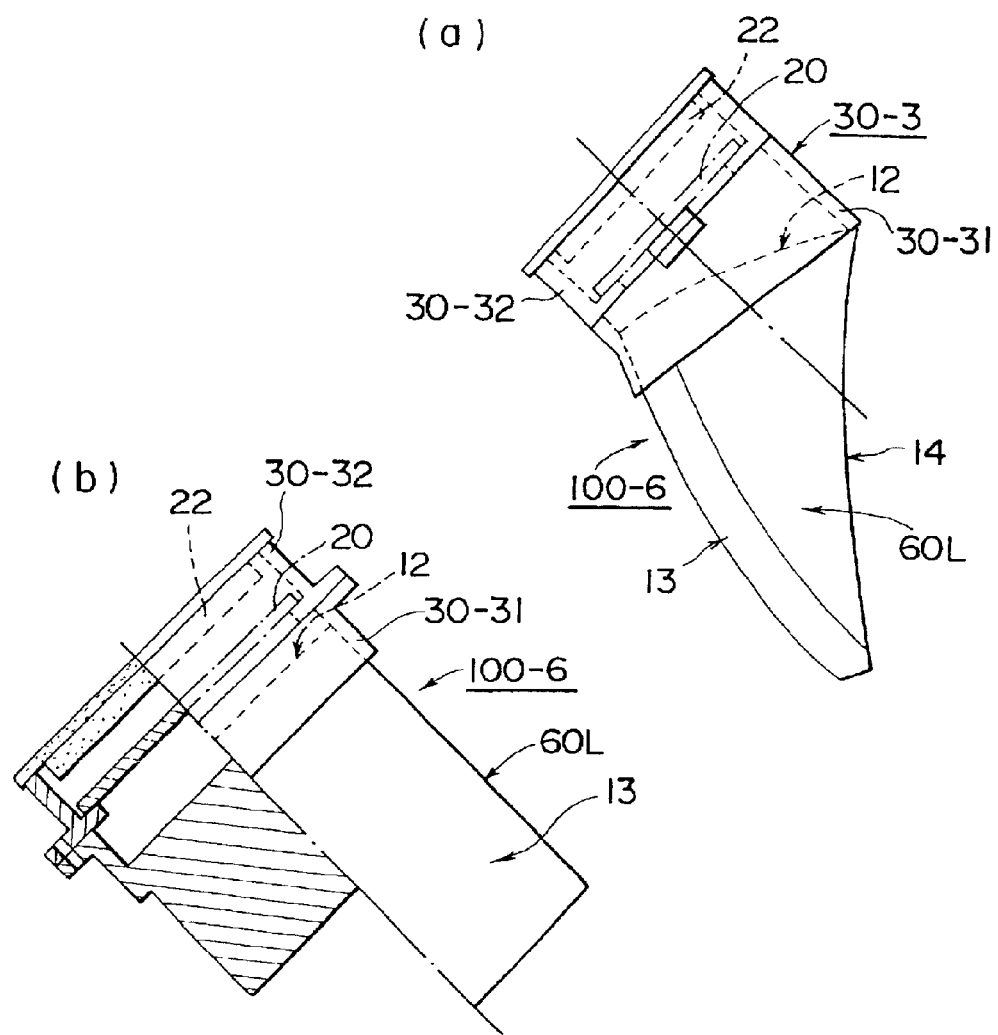
FIGS. 13(a) and 13(b) show a further modification of the optical assembly in connection with FIGS. 1, 11 and 12.

FIGS. 13(a) and 13(b) show a further modification of the optical assembly described before in connection with FIGS. 1, 11 and 12. Specifically, FIG. 13(a) is a side view showing the optical assembly. FIG. 13(b) is view, partly in section, showing the same optical assembly. In FIGS. 13(a) and 13(b), parts like those in FIGS. 1, 11(a) to 11(c) and 12 are designated by like reference numerals.

The display element support 30-3 in this modification, like what is been shown, supports the LCD 20 as the display element and the corresponding backlight 22, and is assembled with the optical prism 100-6 with its skirt 30-31 fitted on a head portion of the optical prism 100-6 on the side of the light incidence surface 12.

In this optical assembly, the display element support 30-3 includes the skirt 30-31 and a sidewall 30-32, which supports the LCD 20 and the backlight 22 and shields external light. The skirt 30-31 and the side wall 30-32 cooperate with the LCD 20 as the display element and the light incidence surface 12 of the optical prism 100-6 to form a shield defining a substantially shielded space. In other words, in this modification the skirt 30-31 extends upward from the optical prism 100-6 and is bonded by flanges to the side wall 30-32 on the side of the display element support 30-3, thus forming the shield.

With the arrangement shown in FIGS. 13(a) and 13(b), in which the shield space is formed on the light incidence surface side of the optical prism, it is possible to reduce the possibility of spoiling of optical characteristic by dust particles attached to the light incidence surface.

Figure 14:
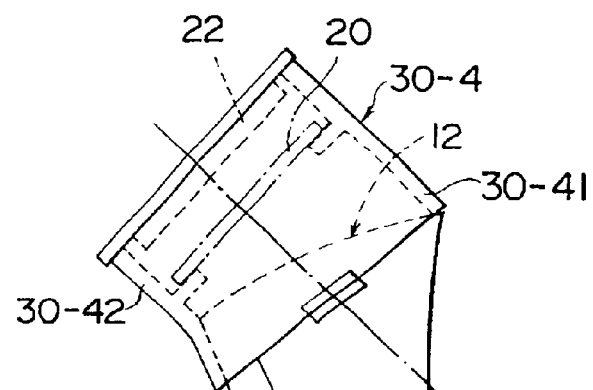
FIGS. 14(a) ad 14(b) show a modification of the preceding optical assembly reference to FIGS. 13(a) and 13(b)
Figure 14:
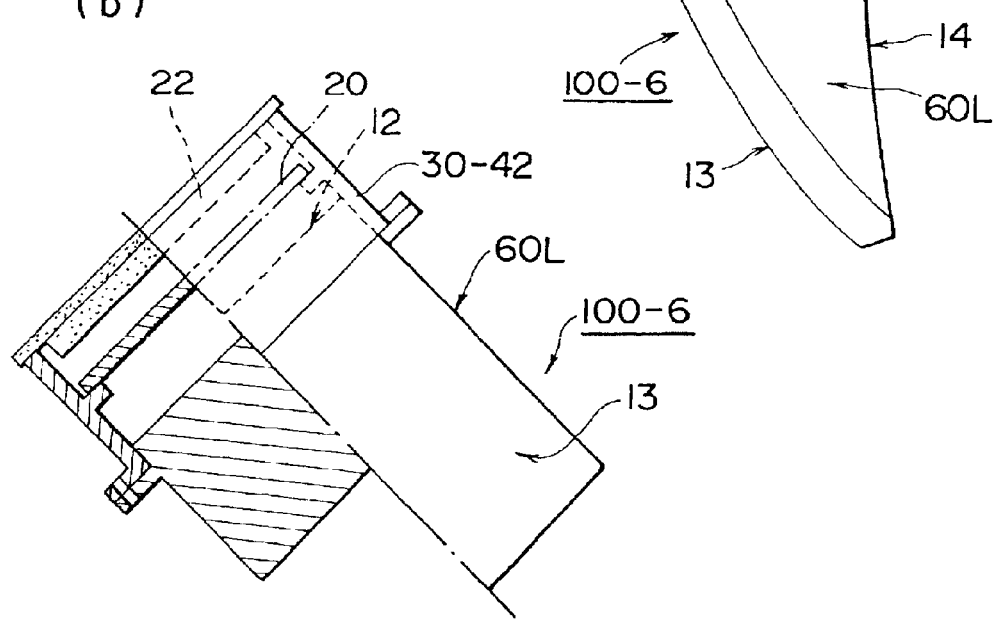
Figure 15:
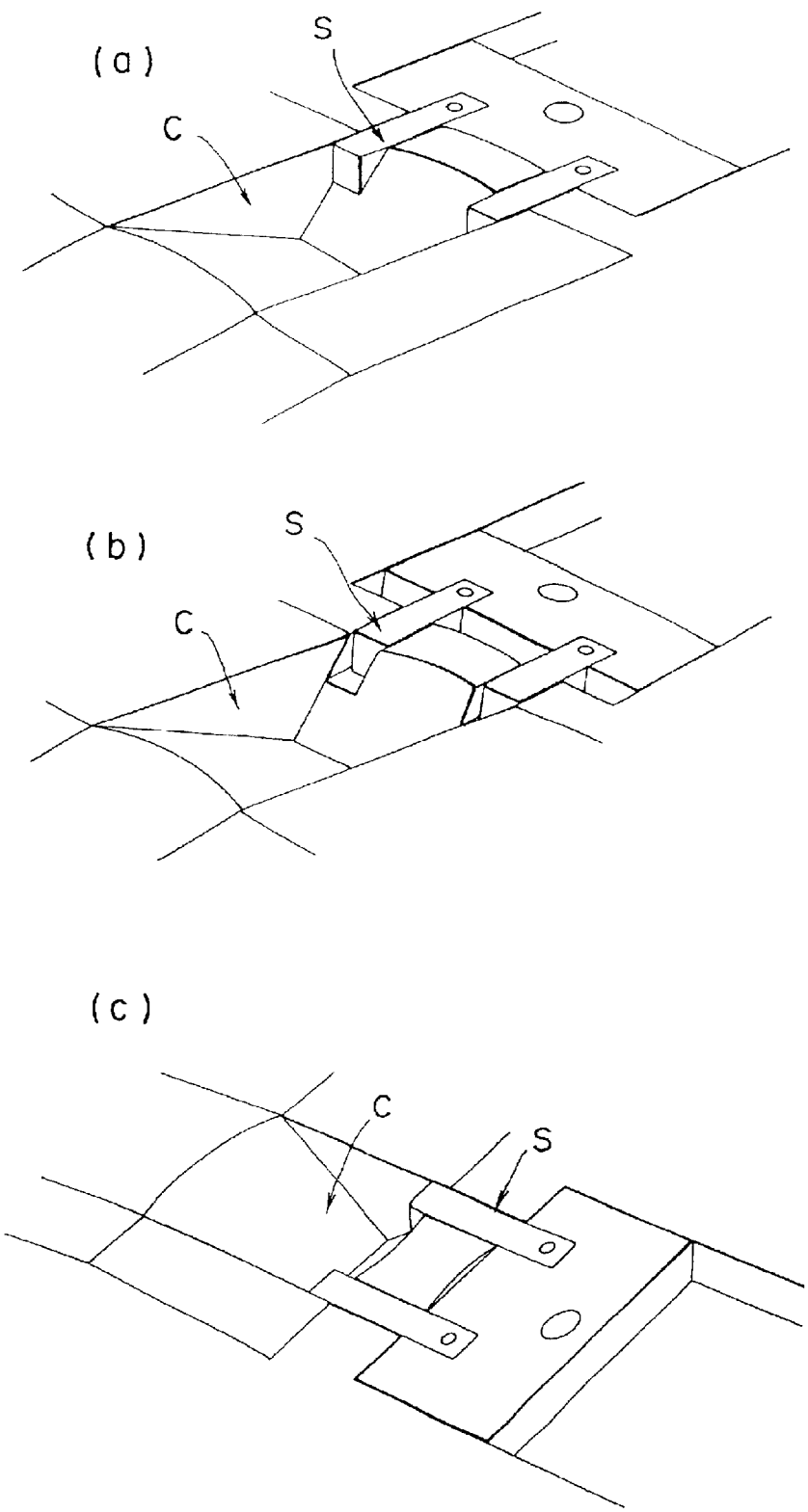
FIGS. 15(a) to 15(c) schematically show a die having the slide function.
Figure 16:
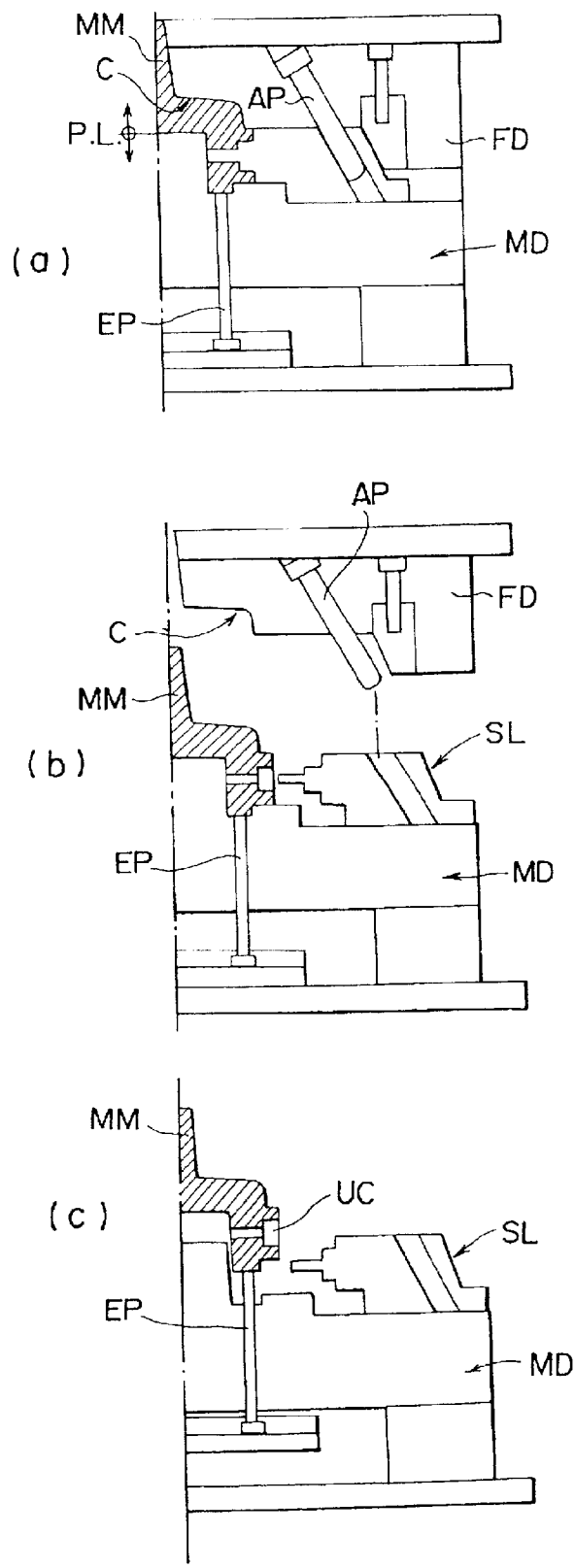
FIGS. 16(a) to 16(c) schematically show a mechanism for moving slide parts of a die having a slide mechanism.

FIGS. 14(a) ad 14(b) show a modification of the preceding optical assembly described with reference to FIGS. 13(a) and 13(b). Specifically, FIG. 14(a) is a side view showing the optical assembly. FIG. 14(b) is a view, partly in section, showing the same optical assembly. In FIGS. 14(a) and 14(b), parts like those in FIGS. 1 and 11(a) to 11(c) to 13(a) to 13(b) are designated by like reference numerals.

In this embodiment, the display element support 30-4, like the preceding one, supports the LCD 20 as the display element and the corresponding backlight, and is assembled with the optical prism 100-6 with its skirt 30-41 fitted on a head portion of the optical prism 100-6 on the side of the light incidence surface 12.

In the optical assembly as shown in FIGS. 14(a) and 14(b), the display element support 30-4 is such that its skirt 30-41 is seamlessly united with its head 30-42, which supports the LCD 20 and the backlight 22 and shields external light, and cooperates with the LCD 20 and the light incidence surface 12 of the optical prism 100-6 to form a shield defining a substantially shielded space.

Again with the modification shown in FIGS. 14(a) and 14(b), in which the shielded space is defined on the light incidence surface side of the optical prism, it is possible to reduce the possibility of spoiling optical characteristic by dust particles attached to the light incidence surface.

According to the present invention, it is possible to provide an optical prism of the type as described, which can ensure the accuracy of its positioning relative to a display element when it is applied as an optical element of apparatuses in OA apparatus and various other fields, while also permitting ready manufacture, as well as a display element support used with the optical prism and an optical assembly including the optical prism and the display element support.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An optical prism comprising a light incidence surface on which light from a display element is incident, a reflecting-emitting surface which reflects light coming from the light incidence surface, a reflecting surface which reflects the light reflected by the reflecting-emitting surface, and directs the light reflected by the reflecting surface onto the reflecting-emitting surface, through which the light leaves the optical prism;

the optical prism being coupled to a display element support having a construction adapted to fit said display element;

said incidence surface being provided at both ends with shoulder surfaces to mount said display element via said display element support, and said shoulder surfaces each being provided at a predetermined site with a positioning boss for holding the optical prism at a predetermined position relative to the display element support.

2. The optical prism according to claim 1, wherein said optical prism is manufactured by an injection molding process, the shoulder surfaces are provided with projections for mounting the optical prism on the display element support and said projections being formed by utilizing slide mechanisms used in the injection molding process.

3. The optical prism according to claim 2, wherein the light incidence surface, the reflecting-emitting surface and the reflecting surface have effective zones spaced apart from edge parts formed by utilizing the slide mechanisms by 0.5 mm to 5.0 mm.

4. The optical prism according to claim 2, wherein the projections formed by utilizing the slide mechanisms each have a plurality of mounting surfaces used for mounting predetermined members.

5. The optical prism according to claim 4, wherein the plurality of mounting surfaces are parallel to one another.

6. The optical prism according to claim 2, a predetermined surface of the projections formed by utilizing the slide mechanisms has an impression of cavity number used in the injection molding.

7. The optical prism according to claim 1, which is manufactured by an injection molding process, a die parting line for the injection molding being set such as to be in a virtual plane substantially including two edges among the edges defined by adjacent ones of its surfaces such as those functioning as the light incidence surface and reflecting-emitting surface, the two edges being not adjacent to but facing each other.

8. The optical system according to claim 7, wherein the die parting line is set such as to be at an angle to a reference die parting line set for the injection molding, the angle being natural number degree.

9. The optical prism according to claim 1, wherein an edge defining a lower end of the reflecting-emitting surface, among edges defined by adjacent ones of the surfaces of the optical prism, is formed such as to extend along an intersection line between a virtual plane and the reflecting-emitting surface, the virtual plane including a line, which is drawn from a virtual point of design, corresponding to a center of rotation of a pupil of an eye of a person observing an image of the light, toward the reflecting-emitting surface and at a predetermined downward angle to a direction of an optical axis passing a predetermined point in the reflecting-emitting surface and the virtual point.

10. The optical prism according to claim 1, which is manufactured by an injection molding process, a die parting line for the injection molding being set in a predetermined locality, a gate for pouring resin being formed at the predetermined locality corresponding to the die parting line, a plurality of projections for ejection being formed at positions at an equal distance from centroid concerning ejecting force.

11. The optical prism according to claim 10, wherein the projections for ejection have substantially the same thickness.

12. The optical prism according to claim 1, wherein at least two surfaces facing each other among the light incidence surface, the reflecting-emitting surface and the reflecting surface have substantially the same dimension in the width direction crossing the optical axis.

13. The optical prism according to claim 1, wherein the light incidence surface, the reflecting-emitting surface and the reflecting surface are curved surfaces such that two adjacent optical surfaces define a curved line.

* * * * *